US012664351B2

(12) United States Patent
Chen et al.

(10) Patent No.: US 12,664,351 B2
(45) Date of Patent: Jun. 23, 2026

(54) AI-BASED SHAPE-ADAPTIVE CONSISTENT VISUAL EFFECT GENERATION

(71) Applicant: Microsoft Technology Licensing, LLC, Redmond, WA (US)

(72) Inventors: Li Chen, Redmond, WA (US); Ji Li, San Jose, CA (US); Xinzhi Mu, Beijing (CN); Shuyang Gu, Beijing (CN); Dong Chen, Beijing (CN); Jianmin Bao, Beijing (CN); Yuhui Yuan, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 18/632,456

(22) Filed: Apr. 11, 2024

(65) Prior Publication Data

US 2025/0322570 A1     Oct. 16, 2025

(51) Int. Cl.
*G06T 11/60*          (2026.01)
*G06F 40/109*         (2020.01)
*G06F 40/40*          (2020.01)

(52) U.S. Cl.
CPC .............. *G06T 11/60* (2013.01); *G06F 40/40* (2020.01); *G06F 40/109* (2020.01); *G06T 2200/24* (2013.01); *G06T 2210/22* (2013.01)

(58) Field of Classification Search
CPC . G06T 11/60; G06T 2200/24; G06T 2210/22; G06F 40/40; G06F 40/109
See application file for complete search history.

(56) References Cited

PUBLICATIONS

Yang et al. (NPL)—"GlyphControl: Glyph Conditional Control for Visual Text Generation"—2023 (Year: 2023).*
Chen et al. (NPL)—"TextDiffuser: Diffusion Models as Text Painters"—2023 (Year: 2023).*
Li et al. (NPL)—"Matting Anything"—2023. (Year: 2023).*
Peong et al. (NPL)—"Typographic Text Generation with Off-the-Shelf Diffusion Model"—Feb. 2024 (Year: 2024).*
Ziyi Li et al. (NPL)—"Open-vocabulary Object Segmentation with Diffusion Models"—2023. (Year: 2023).*

(Continued)

*Primary Examiner* — Daniel F Hajnik
*Assistant Examiner* — Adeel Bash
(74) *Attorney, Agent, or Firm* — NovoTechIP International PLLC

(57) ABSTRACT

A data processing system implements constructing a first prompt including a font mask of a reference character (RC) and a style prompt, sending the first prompt to a text2image model to iteratively generate salient content and concentrate the salient content within the font mask of RC as a first image of RC; concatenating two of the first images as a second image; generating a combined font mask of the font mask of RC and a font mask of a target character (TC); constructing a second prompt including the combined font mask and the second image, sending the second prompt to the model to iteratively generate salient content and in-paint the salient content within a half of the combined font mask as a third image of RC and TC; cropping a styled TC image from the third image using the font mask of TC; providing the styled TC image to a client device.

20 Claims, 13 Drawing Sheets

(56)          References Cited

PUBLICATIONS

He, et al., "WordArt Designer: User-Driven Artistic Typography Synthesis Using Large Language Models", Proceedings of the 2023 Conference on Empirical Methods in Natural Language Processing: Industry Track, In repository of arXiv:2310.18332v2, Nov. 27, 2023, pp. 223-232.

Hertz, et al., "Style Aligned Image Generation via Shared Attention", IEEE/CVF Conference on Computer Vision and Pattern Recognition, In repository of arXiv:2312.02133v2, Jan. 11, 2024, 24 pages.

International Search Report and Written Opinion received for PCT Application No. PCT/US2025/015157, mailed on May 19, 2025, 16 pages.

Jia, et al., "COLE: A Hierarchical Generation Framework for Multi-Layered and Editable Graphic Design", In repository of arXiv:2311.16974v2, Mar. 18, 2024, pp. 1-20.

Tanveer, et al., "DS-Fusion: Artistic Typography via Discriminated and Stylized Diffusion", 2023 IEEE/CVF International Conference on Computer Vision (ICCV), IEEE, Oct. 10, 2023, pp. 374-384.

Wang, et al., "Anything to Glyph: Artistic Font Synthesis via Text-to-Image Diffusion Model", Siggraph Asia 2023 Emerging Technologies, Dec. 10, 2023, pp. 1-11.

Yang, et al., "FontDiffuser: One-Shot Font Generation via Denoising Diffusion with Multi-Scale Content Aggregation and Style Contrastive Learning", Proceedings of the AAAI Conference on Artificial Intelligence, In repository of arXiv:2312.12142v1, vol. 38, No. 7, Dec. 19, 2023, 13 pages.

Zhu, et al., "Artistic Font Generation from Character Stroke Extraction and Controllable Image Diffusion Models", 2024 7th International Conference on Advanced Algorithms and Control Engineering, IEEE, Mar. 2024, pp. 504-508.

* cited by examiner

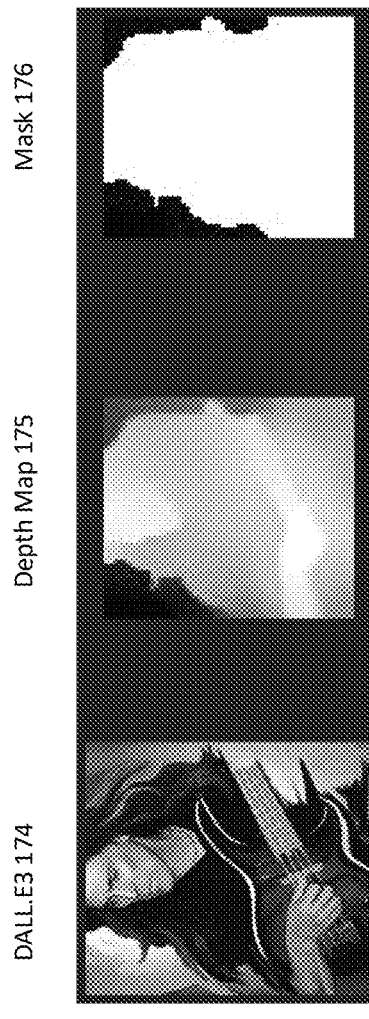
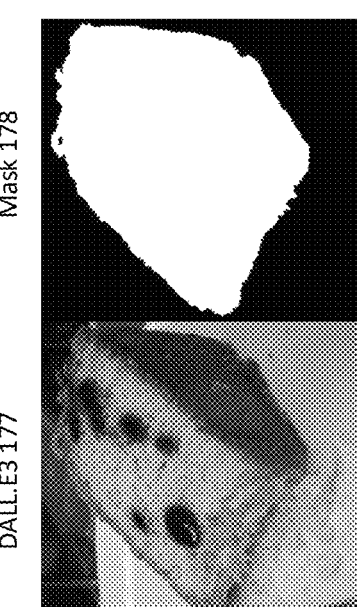
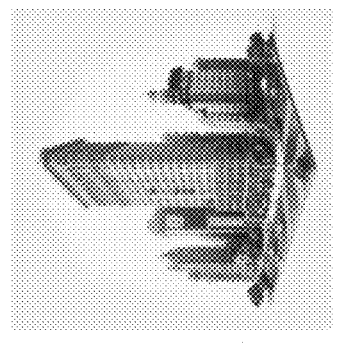
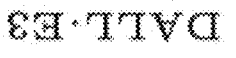
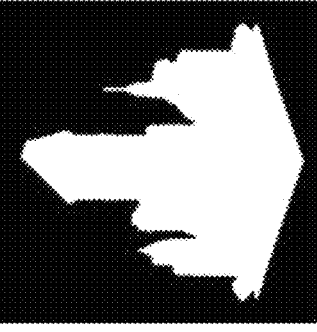
FIG. 1C

| Model | M-CLIP-Int ↑ | M-CLIP-Ext ↓ |
|---|---|---|
| SDXL-ControlNet-Canny | 26.03 | 21.52 |
| SDXL-ControlNet-Depth | 24.11 | 23.24 |
| SGM trained w. Est-depth | 24.51 | 18.28 |
| SGM trained w. Cropped Est-depth | 24.11 | 18.22 |
| SGM w.o SAA | 27.10 | 22.07 |
| SGM | 27.26 | 18.11 |

FIG. 3

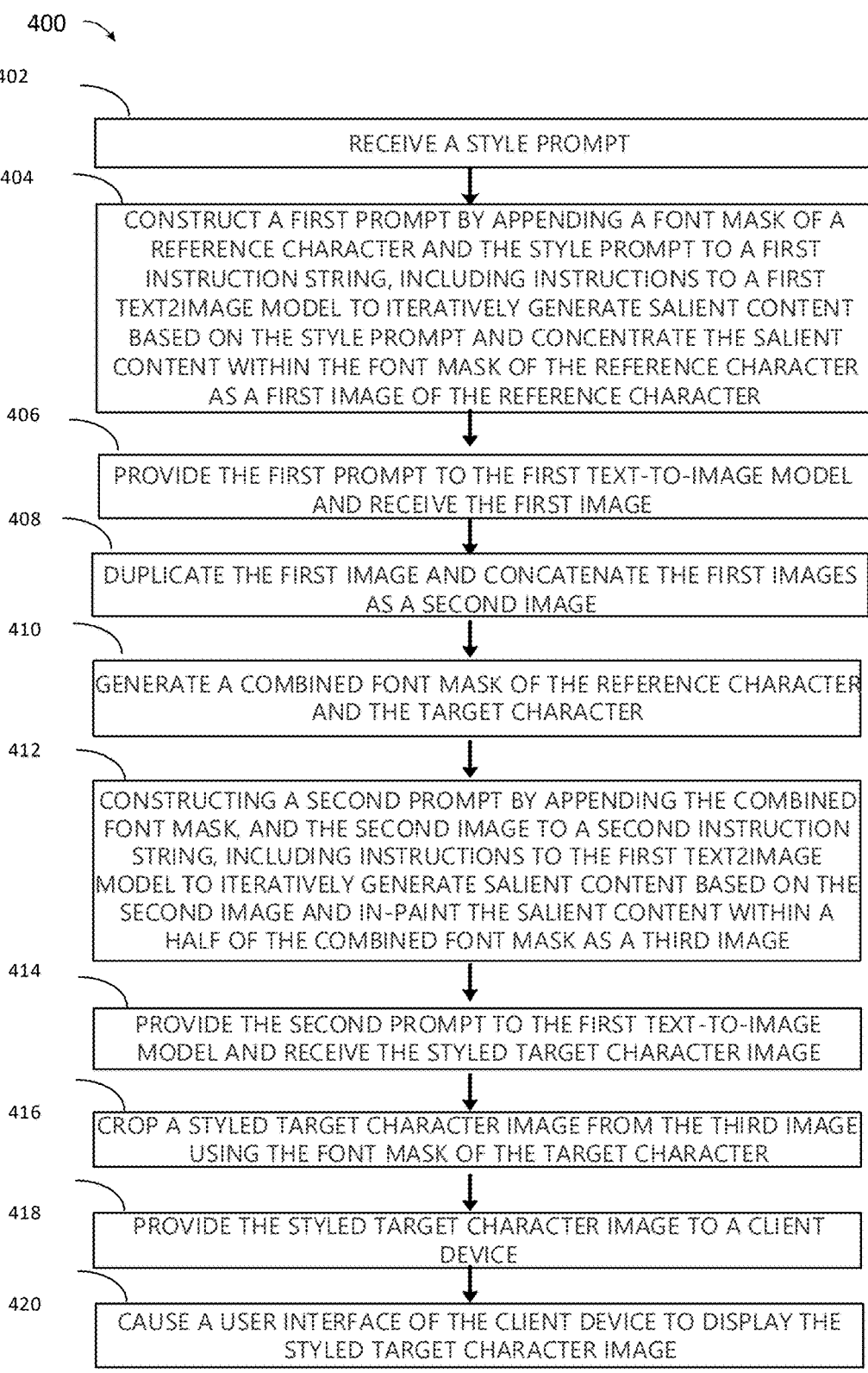

400

402 — RECEIVE A STYLE PROMPT

404 — CONSTRUCT A FIRST PROMPT BY APPENDING A FONT MASK OF A REFERENCE CHARACTER AND THE STYLE PROMPT TO A FIRST INSTRUCTION STRING, INCLUDING INSTRUCTIONS TO A FIRST TEXT2IMAGE MODEL TO ITERATIVELY GENERATE SALIENT CONTENT BASED ON THE STYLE PROMPT AND CONCENTRATE THE SALIENT CONTENT WITHIN THE FONT MASK OF THE REFERENCE CHARACTER AS A FIRST IMAGE OF THE REFERENCE CHARACTER

406 — PROVIDE THE FIRST PROMPT TO THE FIRST TEXT-TO-IMAGE MODEL AND RECEIVE THE FIRST IMAGE

408 — DUPLICATE THE FIRST IMAGE AND CONCATENATE THE FIRST IMAGES AS A SECOND IMAGE

410 — GENERATE A COMBINED FONT MASK OF THE REFERENCE CHARACTER AND THE TARGET CHARACTER

412 — CONSTRUCTING A SECOND PROMPT BY APPENDING THE COMBINED FONT MASK, AND THE SECOND IMAGE TO A SECOND INSTRUCTION STRING, INCLUDING INSTRUCTIONS TO THE FIRST TEXT2IMAGE MODEL TO ITERATIVELY GENERATE SALIENT CONTENT BASED ON THE SECOND IMAGE AND IN-PAINT THE SALIENT CONTENT WITHIN A HALF OF THE COMBINED FONT MASK AS A THIRD IMAGE

414 — PROVIDE THE SECOND PROMPT TO THE FIRST TEXT-TO-IMAGE MODEL AND RECEIVE THE STYLED TARGET CHARACTER IMAGE

416 — CROP A STYLED TARGET CHARACTER IMAGE FROM THE THIRD IMAGE USING THE FONT MASK OF THE TARGET CHARACTER

418 — PROVIDE THE STYLED TARGET CHARACTER IMAGE TO A CLIENT DEVICE

420 — CAUSE A USER INTERFACE OF THE CLIENT DEVICE TO DISPLAY THE STYLED TARGET CHARACTER IMAGE

FIG. 4

AI-BASED SHAPE-ADAPTIVE CONSISTENT VISUAL EFFECT GENERATION

BACKGROUND

Artificial intelligence (AI) has the potential to automate our lives to save time and increase productivity. One area of interest is font effect generation which can be achieved by using diffusion models. While font effect can be generated by using existing AI mechanisms, the existing AI-based font effect generation platforms and/or applications do not generate coherent and consistent visual effects across multiple characters. The visual effects are expressed via a combination of objects, scales, styles, colors, patterns, lighting, and the like. Merely applying the diffusion model in isolation often leads to inconsistent outcomes. Moreover, even applying the diffusion model on multiple characters together does not guarantee the outputs present consistent visual effects, unless consistency is enforced with detailed prompts that are overloaded with style constraints. This often requires repeated tweaking of the detailed prompts to obtain outputs that display character coherent and consistent visual effects, which is frustrating and/or time-consuming for users. There are technical challenges to provide users with fast and easy artistic font generation based on user preferred visual effects. Hence, there is a need for fast and easy AI-based font effect generation systems and methods that generate characters coherently and consistently with any user-desired visual effects.

SUMMARY

An example data processing system according to the disclosure includes a processor and a machine-readable medium storing executable instructions. The instructions when executed cause the processor alone or in combination with other processors to perform operations including receiving, at a client device, a style prompt; constructing, via a prompt construction unit, a first prompt by appending a font mask of a reference character and the style prompt to a first instruction string, the first instruction string including instructions to a first text-to-image model to iteratively generate salient content based on the style prompt and concentrate the salient content within the font mask of the reference character as a first image of the reference character; providing as an input the first prompt to the first text-to-image model and receiving as an output the first image from the first text-to-image model; duplicating the first image and concatenating the first images as a second image; generating a combined font mask of the font mask of the reference character and a font mask of a target character; constructing, via the prompt construction unit, a second prompt by appending the combined font mask and the second image to a second instruction string, the second instruction string including instructions to the first text-to-image model to iteratively generate salient content based on the second image and in-paint the salient content within a half of the combined font mask as a third image of the reference character and the target character; providing as an input the second prompt to the first text-to-image model and receiving as an output the third image from the first text-to-image model; cropping a styled target character image from the third image using the font mask of the target character; providing the styled target character image to the client device; and causing a user interface of the client device to display the styled target character image.

An example method implemented in a data processing system includes receiving, at a client device, a style prompt; constructing, via a prompt construction unit, a first prompt by appending a font mask of a reference character and the style prompt to a first instruction string, the first instruction string including instructions to a first text-to-image model to iteratively generate salient content based on the style prompt and concentrate the salient content within the font mask of the reference character as a first image of the reference character; providing as an input the first prompt to the first text-to-image model and receiving as an output the first image from the first text-to-image model; duplicating the first image and concatenating the first images as a second image; generating a combined font mask of the font mask of the reference character and a font mask of a target character; constructing, via the prompt construction unit, a second prompt by appending the combined font mask and the second image to a second instruction string, the second instruction string including instructions to the first text-to-image model to iteratively generate salient content based on the second image and in-paint the salient content within a half of the combined font mask as a third image of the reference character and the target character; providing as an input the second prompt to the first text-to-image model and receiving as an output the third image from the first text-to-image model; cropping a styled target character image from the third image using the font mask of the target character; providing the styled target character image to the client device; and causing a user interface of the client device to display the styled target character image.

An example non-transitory computer readable medium data processing system according to the disclosure on which are stored instructions that, when executed, cause a programmable device to perform functions of receiving, at a client device, a style prompt; constructing, via a prompt construction unit, a first prompt by appending a font mask of a reference character and the style prompt to a first instruction string, the first instruction string including instructions to a first text-to-image model to iteratively generate salient content based on the style prompt and concentrate the salient content within the font mask of the reference character as a first image of the reference character; providing as an input the first prompt to the first text-to-image model and receiving as an output the first image from the first text-to-image model; duplicating the first image and concatenating the first images as a second image; generating a combined font mask of the font mask of the reference character and a font mask of a target character; constructing, via the prompt construction unit, a second prompt by appending the combined font mask and the second image to a second instruction string, the second instruction string including instructions to the first text-to-image model to iteratively generate salient content based on the second image and in-paint the salient content within a half of the combined font mask as a third image of the reference character and the target character; providing as an input the second prompt to the first text-to-image model and receiving as an output the third image from the first text-to-image model; cropping a styled target character image from the third image using the font mask of the target character; providing the styled target character image to the client device; and causing a user interface of the client device to display the styled target character image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1B-1E are conceptual diagrams of an AI-based consistent font visual effect generation pipeline of the system of FIG. 1A according to principles described herein.

FIG. 3 is a table showing benchmarks for evaluating AI-based consistent font visual effect generation of the system of FIG. 1A.

FIG. 4 is a flow chart of an example process for AI-based consistent font visual effect generation according to the techniques disclosed herein.

DETAILED DESCRIPTION

Figure 1A:
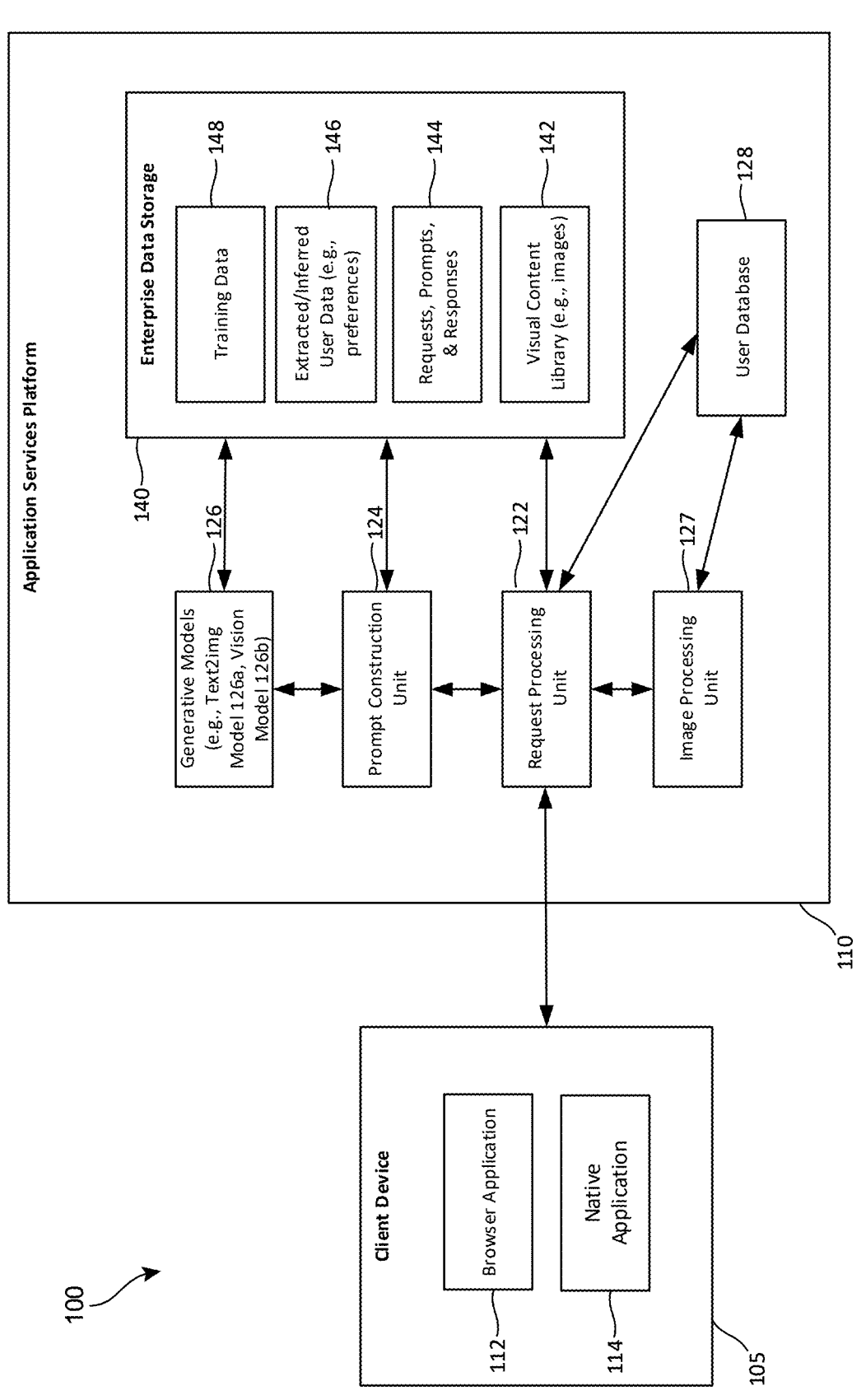
FIG. 1A is a diagram of an example computing environment in which the techniques for AI-based consistent font visual effect generation using a shape-adaptive generative model are implemented.

Systems and methods for AI-based consistent font visual effect generation via an inpainting and cropping pipeline using a shape-adaptive generative model are described herein. These techniques provide a technical solution to the technical problem of lack of fast and easy AI-based consistent font visual effect generation systems and methods that transfer user-desired visual content/styles/textures across multiple characters. The existing AI-based font visual effect generation systems automate many design tasks that were previously done manually, such as font template generation, font creation prompt generation, and the like. Effective prompting skills are essential for achieving high-quality artistic fonts when utilizing vision generative models. Recently, diffusion-based text-to-image generation models have been applied to create artistic fonts. While this text-to-image approach can provide impressive results, they cannot generate coherent and consistent visual effects across characters. To provide aesthetic consistency, there are challenges of prompt fidelity, object placement on the canvas, and the like. As results, the visual effects of the generated character images do not have adequate consistency over e.g., colors, scales and lighting, across multiple characters. The key challenge in font effect generation arises from the gap between most existing diffusion models, which are trained on rectangular canvases, and the requirement of consistent font visual effect generation across different characters on any given irregularly shaped canvas.

To address these issues, the proposed AI-based consistent font visual effect generation pipeline introduces a shape-adaptive generative model that adapts the existing rectangular canvases into irregularly shaped canvas (i.e., non-rectangular canvas), and performs visual content creation on the irregularly shaped canvas. The shape-adaptive generative model includes a generation model, a refinement model, and a visual effect transfer scheme. The generation model is a text-to-image model (e.g., a conditional diffusion model) trained with a dataset of shape-adaptive mask-image-text triplets to generate content within a font-shaped canvas as a styled character image. In one implementation, the dataset of shape-adaptive mask-image-text triplets is generated by another text-to-image model (e.g., DALL•E3) to train the generation model to generate content inside irregular (i.e., non-rectangle) canvas. A shape-adaptive attention scheme is applied during inference to improve prompt fidelity. The generation model can interpret a given shape of a character and strategically plans pixel distributions within an irregular canvas. To achieve this, the generation model curates a high-quality shape-adaptive image-text dataset and incorporates the segmentation mask as a visual condition to steer the image generation process within the irregular-shaped canvas. This pipeline modifies the existing rectangle-shaped canvas-based diffusion model to produce the desired artistic fonts in accordance with any provided non-rectangle shapes.

The refinement model uses a text-to-image model to refine content edges of a character image, and uses a vision generative model (e.g., a variational autoencoder, VAE) to produce a refined character mask. In particular, the text-to-image model refines the edge details of the styled character image for a more natural appearance (e.g., some croissant edges naturally protruding outside the font shape) through regeneration. The VAE is a conditional VAE trained to obtain an alpha channel in a styled character image, and to generate a precise post-refinement alpha mask. In other words, the conditional VAE expresses the fine detail of the mask edge more precisely.

The visual effect transfer scheme (herein referred to as a shape-adaptive effect transfer scheme) transfers a style of a reference character image to a target character image with visual effect consistency. To maintain consistency across multiple characters, the visual effect transfer scheme transfers content/styles/textures from a styled reference character to other characters. In one implementation, the visual effect transfer scheme builds a font effect noise prior and propagates the font effect information in a concatenated latent space.

In one example, the pipeline improves artistic font generation that leverages generative AI models (e.g. a shape-adaptive generative model trained with a triplet training dataset, each triplet consisting of irregular-canvas, irregular-image and text prompt) in order to generate coherent and consistent visual content within a font-shaped canvas. The pipeline includes a font generation architecture applying inpainting/cropping for generating visual content in a font-shaped canvas based on a text prompt. Therefore, the pipeline provides an easy-to-use user experience (UX) related to consistent font visual effect generation in which a tangible result in the form of character images infused with a desired style and edge details is provided, which can be used in any systems, platforms, or applications (e.g., Microsoft Designer®).

A technical benefit of the approach provided herein is adeptly responding to user style prompts at runtime, and creating high-quality and aesthetically pleasing font effects across different characters.

Another technical benefit of this approach is to perform visual content style transfer among characters using text-to-image models and/or vision generative models within a design platform with great user convenience by allowing users to set a style prompt, thereby alleviating the burden of style text prompt engineering during the artistic character generation process.

Another technical benefit of this approach is to improve aesthetic effects with fidelity to user prompts by placing an object in an irregular-shaped canvas, e.g., a target character shape, thereby generating a refined character image with natural details protruding outside of the font shape. Such irregular-shaped canvas is generated by a text-to-image model trained based on a special dataset of triplet instances and called with a carefully conditioned prompt.

Another technical benefit of the approach provided herein is to prepare the special dataset of triplet instances, each instance consisting of an irregular-shaped canvas mask, an irregular-shaped image, and a text prompt, by applying foreground and background segmentation of sourced images.

Another technical benefit of the approach provided herein is to train a conditional text-to-image model including any backbone models including various versions of stable diffusion models into the generation model of the shape-adaptive generative model.

Another technical benefit of the approach provided herein is to significantly improve the user experience in character creation within a design platform and in deployment as a new mini-application within the design platform, or within any other platforms/applications, when the user utilizes the other platforms/applications at any point the user desires to create consistent artistic characters.

Another technical benefit of the approach provided herein is that the approach can work with existing techniques such as prompt engineering, or other conditioning modules such as ControlNet, Lora, hypernetwork, embedding style, or the like.

Yet another technical benefit of the approach provided herein is to provide detailed inpainting and cropping consistency control thereby improving the coherency of the design across the various of assets of different shapes (e.g., characters) beyond their defined/smooth shapes.

Another technical benefit of the approach provided herein is to directly generate font assets with alpha channel. This does not only save the step of removing the background, but also preserves fine natural details of objects around the edges of the font shape which further improve the visual effects.

Yet another technical benefit of this approach is storing the character images in the system thereby saving the user significant time and effort in creating similar characters in the future. These and other technical benefits of the techniques disclosed herein will be evident from the discussion of the example implementations that follow.

A "font" refers to a specific style of a character printed on a page or displayed on a computer screen. A "font mask" refers to an opaque rectangle mask with irregular (i.e., non-rectangle) transparent area(s) in a defined smooth shape/edge of a character of a specific style. An "styled font image" refers to an image of content and/or texture presented within a smooth shape/edge of a character. A "refined font image" refers to an image of content and/or texture with natural edge details protruding outside of a smooth shape/edge of a character, while the edge details are generated based on an alpha channel of a styled font image. A "refined font mask" refers to an opaque rectangle mask with irregular (i.e., non-rectangle) transparent area(s) of a refined font image.

The term "style" refers to the distinctive visual characteristics of an image. These characteristics can include color palette, texture (e.g., brushstrokes), composition, layout, structure, scale, typography, level of details and abstraction, whitespace, overall mood, atmosphere, and the like. This definition is more flexible than some defined styles such as minimalist, retro, modern, or the like.

Although various embodiments are described with respect to visual effect transfer across characters based on a style prompt, it is contemplated that the approach described herein may be used for visual effect transfer across a set of visual content items with different non-rectangle shapes ("shape-adaptive visual effect transfer"). For example, the related visual content items are a set of symbols, a set of music notes, a set of numbers, a set of icons, a set of emojis, a set of animated fonts, and the like.

Although various embodiments are described with respect to visual effect transfer across characters based on a style text prompt, it is contemplated that the approach described herein may be used for any shape-adaptive visual effect transfer based on a style image prompt, to transfer the style of a reference image of an object with one shape to another image of another object with a different shape. For instance, the pipeline can skip the reference character image generating step and use the image prompt instead, then continue with the remaining steps to transfer the style of a reference character image to another character image.

The term "visual effect" refers to any human visible effects generated in response to seeing a visual content item. Common forms of visual content item include photos, diagrams, charts, images, infographics, videos, animations, screenshots, memes, slide decks, pictograms, ideograms, gaming interfaces, software application backgrounds, graphic designs (e.g., publication, email marketing templates, PowerPoint presentations, menus, social media ads, banners and graphics, marketing and advertising, packaging, visual identity, art and illustration graphic design, game interface, app design, and the like), etc.

FIG. 1A is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to AI-based consistent font visual effect generation applications, presentation applications, website authoring applications, collaboration platforms, communications platforms, and/or other types of applications in which users may create, view, and/or consistently transfer various styles of characters. In the implementation shown in FIG. 1A, the application services platform 110 also applies generative AI to easily generate fast and satisfactory styled character images upon user demand according to the techniques described herein. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1A includes a single client device 105, other implementations may include a different number of client devices that utilize services provided by the application services platform 110.

The client device 105 includes a native application 114 and a browser application 112. The native application 114 is a web-enabled native application, in some implementations, which enables easy visual content style transfer. The web-enabled native application utilizes services provided by the application services platform 110 including but not limited to creating, viewing, and/or consistently transferring various styled character images. The native application 114 implements a user interface 205 shown in FIGS. 2A-2D in some implementations. In other implementations, the browser application 112 is used for accessing and viewing web-based content provided by the application services platform 110. In such implementations, the application services platform 110 utilizes one or more web applications, such as the browser application 112, that enables users to view, create, and/or consistently transfer visual content style across objects of different shapes using for example an online application. The browser application 112 implements the user interface 205 shown in FIGS. 2A-2D in some implementations. The application services platform 110 supports both the native application 114 and the browser application 112 in some implementations, and the users may choose which approach best suits their needs.

The application services platform 110 includes a request processing unit 122, a prompt construction unit 124, generative model(s) 126, an image processing unit 127, a user database 128, and an enterprise data storage 140 that includes a visual content library 142, requests, prompts, and responses 144, extracted/inferred user data 146 (e.g., user preferences), training data 148, and the like. The request processing unit 122 is configured to receive requests from the native application 114 and/or the browser application 112 of the client device 105. The requests may include but are not limited to requests to create, view, and/or consistently transfer various styles of characters according to the techniques provided herein.

Figure 1B:
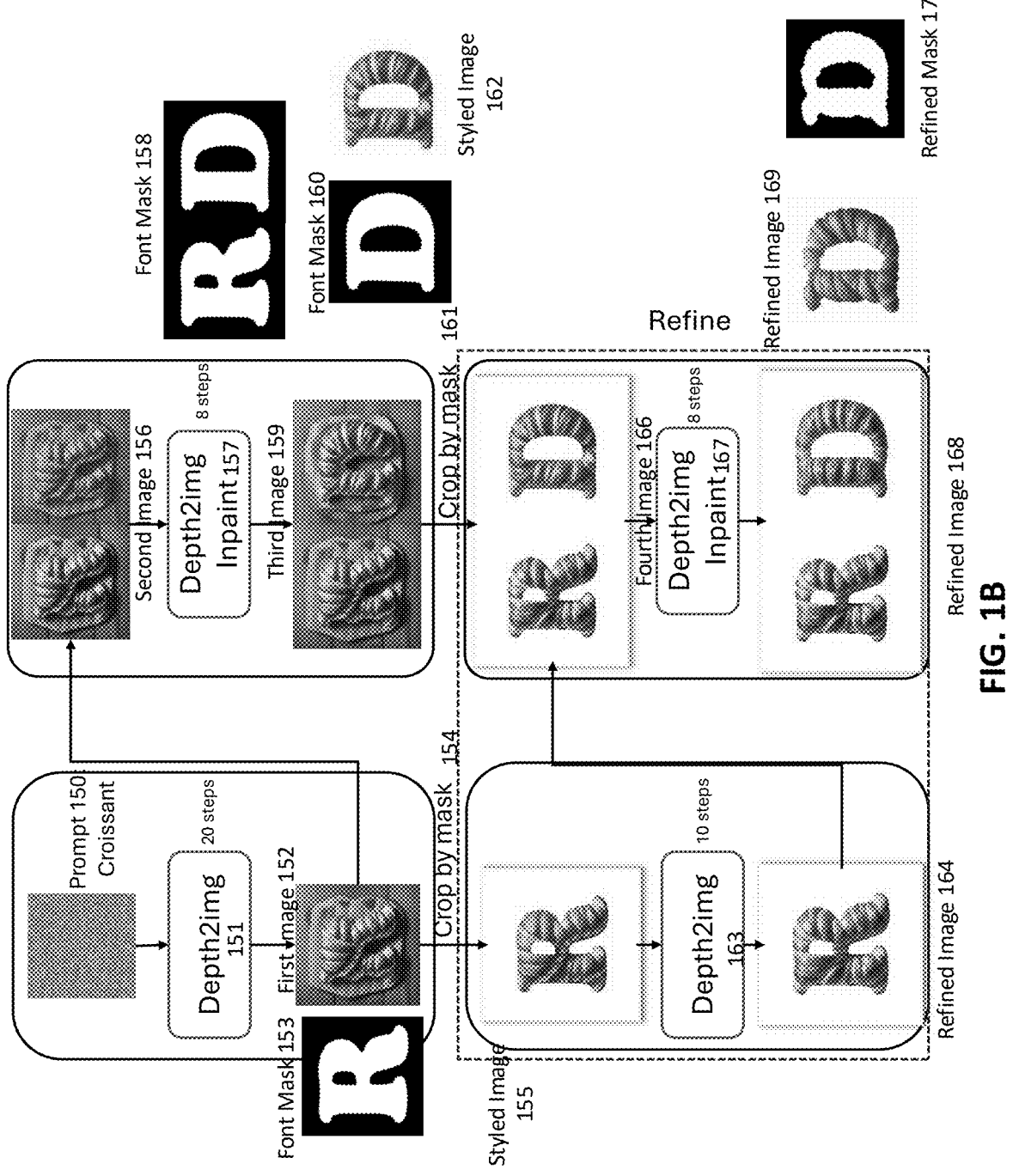

FIGS. 1B-1E are conceptual diagrams of an AI-based consistent font visual effect generation pipeline of the system of FIG. 1A according to principles described herein. The consistent font visual effect generation pipeline leverages the advanced capabilities of text-to-image model(s) 126a and vision generative model(s) 126b, to generate character images based on a style prompt at runtime. FIG. 1B includes four quadrants, with the first and second quadrants corresponding to the generation model of the shape-adaptive generative model (i.e., the shape-adaptive generation model, SGM), the third and fourth quadrants corresponding to the refinement model of the shape-adaptive generative model (i.e., a shape-adaptive refinement model, SRM), the visual effect transfer scheme embedded in the third and fourth quadrants.

According to the shape-adaptive generative model, in response to a style prompt 150 (e.g., croissant), the consistent font visual effect generation pipeline first rasterizes the reference character (e.g., R) into a font image 152, and then crops the font image 152 with a font mask 153 of the reference character (e.g., R), to generate a styled reference character image 155. The style prompt 150 can be saved in the enterprise data storage 140 as a part of the requests, prompts, and responses 144. Secondly, the pipeline applies a text-to-image model 126a (e.g., a conditional diffusion model) to iteratively generate salient content of a croissant and concentrate the salient content within the font mask 153 of the reference character in a depth-to-image (i.e., a conditional text-to-image) process 151 (e.g., for 20 steps/times) using a conditional text2img model (e.g., the conditional diffusion model) to generate a first image 152 of the reference character (e.g., R). Thirdly, the pipeline first applies the image processing unit 127 to crop a styled reference character image 155 from the first image 152 using the font mask 153 of the reference character (e.g., R) in a crop-by-mask process 154. As shown in the first quadrant (i.e., the upper left-hand corner) of FIG. 1B, the font mask 153 has smooth edges around the character R in a rectangular canvas to define an irregular canvas to iteratively fill in the salient content. Even though the first image 152 still has background artifacts beside three croissants, the background artifacts are cropped out from the styled reference character image 155 with only the three croissants and a white background.

Moving towards the second quadrant (i.e., the upper right-hand corner) of FIG. 1B, the consistent font visual effect generation pipeline first applies the image processing unit to duplicate the first image 152 and concatenate the first images as a second image 156. Secondly, the pipeline applies the image processing unit to generate a combined font mask 158 of the reference character (e.g., R) and a target character (e.g., D). Thirdly, the pipeline applies the text-to-image model 126a to iteratively generate salient content based on the second image 156, and to in-paint the salient content within the right half of the second image 156 under the guidance of the combined font mask 158 in a depth-to-image & in-painting process 157 (e.g., for 8 steps/times) using a conditional text2img model (e.g., the conditional diffusion model) to generate a third image 159 of the reference character and the target character. Fourthly, the pipeline applies the image processing unit to crop a styled target character image 162 from the third image 159 using a font mask 160 of the target character (e.g., D) in a crop-by-mask process 161.

The combined rectangle font mask 158 has smooth edges around the characters R and D to define irregular canvases to iteratively in-paint in the salient content to transform the second image 156 (e.g., a pair of generally R-shaped croissant graphics) into the third image 159 (e.g., an image showing a generally R-shaped croissant graphic and a generally D-shaped croissant graphic). Even though the generally D-shaped croissant graphic still has background artifacts beside two croissants, the background artifacts are cropped out from third image 159, such as the styled target character image 162 has only the two croissants and a white background. Accordingly, a first stage of the visual effect transfer scheme is accomplished by generating the styled target character image in a smooth font shape in a white background.

After the shape-adaptive generation model generates content inside irregular canvases in the second quadrant and the first quadrant of FIG. 1B, the shape-adaptive refinement model takes over to refine the irregular image edges for a more natural appearance and generates a precise post-refinement alpha mask in the third quadrant and the fourth quadrant of FIG. 1B respectively.

Moving towards the third quadrant (i.e., the lower left-hand corner) of FIG. 1B, the consistent font visual effect generation pipeline first applies the text-to-image model 126a in a depth-to-image process 163 (e.g., for 10 steps/times) to refine the edge details of the styled reference character image 155 into the refined image of the reference character 164 with a more natural appearance (e.g., some croissant edges naturally protruding outside the font shape) through regeneration. The styled reference character image 155 has only the three croissants in a smooth R-shaped boundary and a white background. On the other hand, the refined image of the reference character 164 has the three croissants in a generally R-shaped boundary with more defined and natural croissant edges in a white background.

Moving towards the fourth quadrant (i.e., the lower right-hand corner) of FIG. 1B, the consistent font visual effect generation pipeline first applies the image processing unit to concatenate the refined image of the reference character 164 and the styled target character image 162 as a fourth image 166. The styled target character image 162 has only two croissants in a smooth D-shaped boundary and a white background. Secondly, the pipeline applies the text-to-image model 126a in a depth-to-image process 167 (e.g., for 8 steps/times) to refine the edge details of the styled target character image 162 (the right half of the fourth image 166) into a refined image 168 including a refined image of the target character 169 with a more natural appearance (e.g., some croissant edges naturally protruding outside the font shape) through regeneration. The refined image of the target character 169 has the two croissants in a generally D-shaped boundary with more defined and natural croissant edges in a white background. Thirdly, the pipeline applies the image processing unit to crop a refined image of the target character 169 from the refined image 168. Fourthly, the pipeline applies a conditional VAE (i.e., a shape-adaptive VAE decoder (SVD) explained below with FIG. 1D) to extract an alpha channel of the refined image of the target character 169. An alpha channel is an additional channel to RGB channels within an image file that specifically stores transparency information for each pixel, and an alpha channel value ranges between 0 (black) and 255 (white). The alpha channel is a refined font mask of the target character 170. The final output is a combination of the refined image 169 (i.e., the RGB part) and the refined mask 170 (i.e., the A part)), together as a RGBA image that the user requested. Accordingly, a second stage of the visual effect transfer scheme is accomplished by generating the refined target character image with more defined and natural croissant edges in a white background.

FIG. 1C depicts example training data for the shape-adaptive generation model (SGM), e.g., the conditional diffusion model. In one implementation, the consistent font visual effect generation pipeline applies a text-to-image model (e.g., DALL-E 3 or a diffusion model) to create a plurality of text prompts based on sourced image captions (encompassing a broad spectrum of concepts, e.g., via Bootstrapping Language-Image Pre-training, BLIP), such as a city high-rise landscape, a guitar player, a slice of cake, and the like. Secondly, the pipeline applies a meta prompt (e.g., the text prompt in Table 1) to DALL-E 3 to iteratively generate based on a respective one (e.g., a city high-rise landscape) of the text prompts a respective image (e.g., a DALL-E 3 image 171 of a city high-rise landscape) differentiating a foreground from a background, to segregate the foreground from the respective image to generate a respective irregular-shaped canvas mask (e.g., a mask 172 of the city high-rise landscape) and a respective irregular-shaped image, and to generate a dataset of triplet instances, each instance consisting of the respective irregular-shaped canvas mask, the respective irregular-shaped image, and the respective text prompt. An augmented mask 173 can be used as an input condition for training the shape-adaptive VAE decoder (SVD) as discussed later, to ensure the SVD learns to refine augmented masks into refined masks.

TABLE 1

A city high-rise landscape. The whole scene is set against a clean white background, with no elements being cut off In another embodiment, the consistent font visual effect generation pipeline generates training images (e.g., an image 174 of a guitar player) from anime images generated by a diffusion model (e.g., revAnime images by Stable Diffusion Version 1.5) based on text prompts (e.g., a guitar player), and uses depth images (e.g., a depth map 175 of the guitar player image 174) to generate training masks (e.g., a mask 176 of the guitar player image) as the dataset for training a text-to-image model (e.g., SD2.0 model) into a conditional text to image model (i.e., a depth2img model).

In yet another embodiment, the consistent font visual effect generation pipeline uses OpenImageV7 segmentation image data and crawled DALL-E 3 images as training images (e.g., an image 177 of a slice of cake), and applies a segmentation model to output auto-generated training masks (e.g., a mask 178 of the slice of cake) as the dataset for training a text-to-image model (e.g., SDXL 1.0 base model) into a conditional text-to-image model (i.e., a depth2img ControlNet model). All or some of the above training datasets can be saved in the enterprise data storage 140 as a part of the training data 148.

Figure 1D:
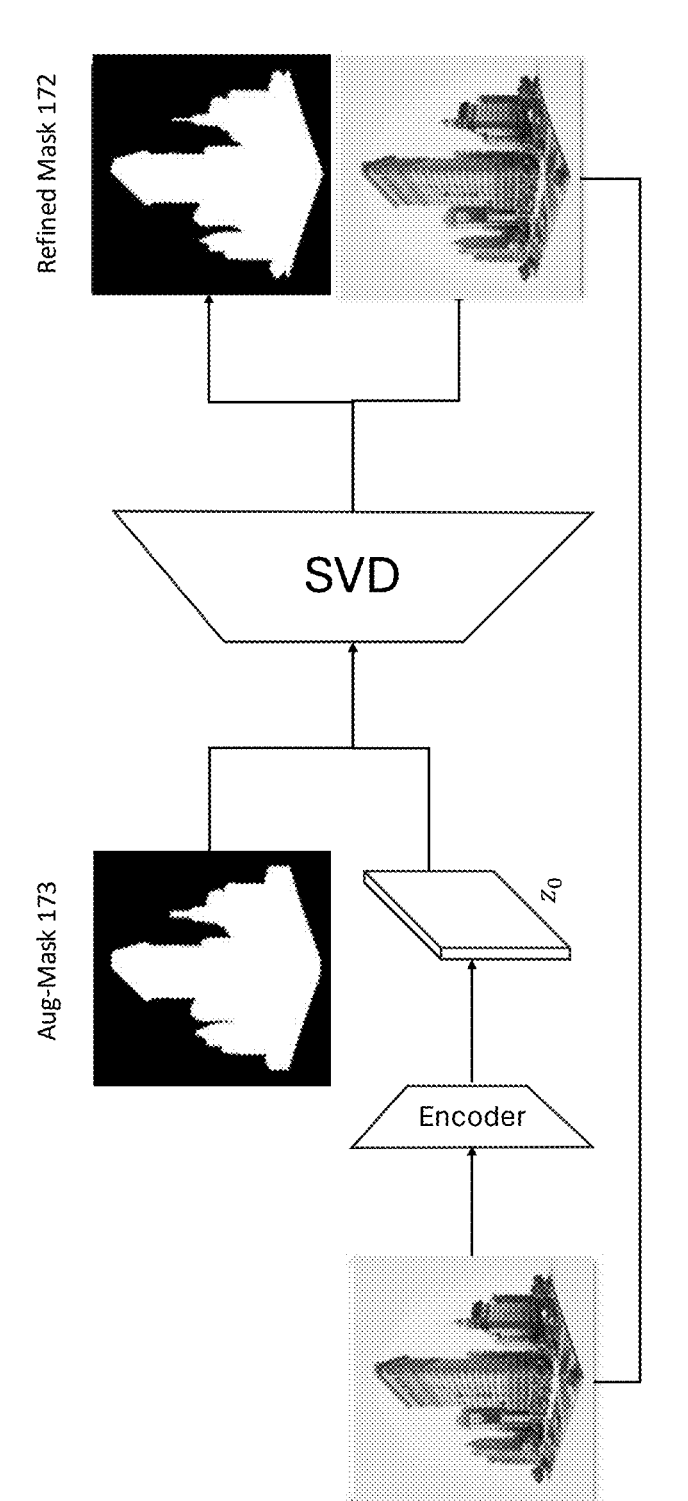

A SVD training pipeline in FIG. 1D trains a SVD, i.e., a decoder of the conditional VAE of the shape-adaptive refinement model (SRM). VAE is an original stable diffusion component to encode/decode between a latent space and an image space. SVD is the component in the SRM which is modified from a VAE to output an alpha channel. In one embodiment, when the input to SVD is an RGB image (such as a croissant letter D), the output from the SVD is an RGBA image, i.e., the RGB image with alpha channel. The SVD training pipeline first prompts a segmentation model (e.g., the Segment Anything Model (SAM), U-net, or the like) to generate original segmentation masks (e.g., the Aug-mask 173). SAM is a prompt-based instance segmentation model that allows automatic generation of masks around user-specified points in an image. The SAM prompt can be a text description, a bounding box around object(s), or the like, and the SAM prompt corresponds to the text prompt in the dataset of triplet instances, Secondly, the SVD training pipeline uses the SAM-based segmentation masks and human-designed canvas masks to train/fine-tune the VAE decoder into the shape-adaptive VAE decoder (SVD). In one implementation, the SVD training pipeline applies alpha mask augmentation to the SAM-based segmentation masks, by applying various modifications to both the original image and its corresponding alpha mask during training, to ensure the modifications are applied consistently to both the original image (e.g., the DALL-E3 image 173) and the alpha mask (e.g., the refined mask 172), while preserving the intended segmentation. The SVD training pipeline then uses the augmented masks (e.g., the Aug-mask 173) as input conditions during SVD training, thereby ensuring that SVD learns to refine the augmented masks (e.g., the Aug-mask 173) into refined masks (e.g., the refined mask 172) with the alpha channel. A comparison between SVD and SAM reveals that SAM tends to generate masks that are somewhat coarse, occasionally leaving blank spaces within characters uncleaned. On the other hand, SVD leverages the input mask as guidance, significantly lowering the likelihood of errors and producing more accurate alpha masks. In FIG. 1D, the original VAE decoder is augmented with one additional input channel and one additional output channel to facilitate mask conditioning and prediction.

The mathematical formulations of the consistent font visual effect generation pipeline starts with defining font effect generation. The subscript ^ is used to indicate that the given tensor has a non-rectangular and irregular spatial shape. For example, X represents a tensor with a rectangular spatial shape like h×w, while $\hat{X}$ denotes a tensor of irregular shape with variable dimensions.

Given a target font effect text prompt T and a sequence of irregular font shape canvases $\{\hat{M}_i | i=1, \ldots, n\}$ corresponding to a sequence of characters, the objective is to build a set-to-set mapping function f(•) that can generate a set of coherent and consistent font effect images $\hat{I}_i |$ i=1, . . . , n} of the same shape as the given irregular font-shape canvases $\{\hat{M}_i | i=1, \ldots, n\}$ accordingly. The mathematical formulation of font effect generation process can be illustrated as follows.

$$\hat{I}_i | i = 1, \ldots, n\} = f(\{\hat{M}_{i} | i = 1, \ldots, n\} | T) \tag{1}$$

In an example, the pipeline accesses the font effect generation quality from the following four aspects:

Aesthetics: Each generated image $\hat{I}_{i,i}$ should be visually attractive.

Font Shape Fidelity: While an exact match is not necessary, each $\hat{I}_{i,i}$ should closely resemble its original font shape $\hat{M}_i$.

Font Style Consistency: $\hat{I}_{i,i}$ should exhibit a coherent style for any other image $\hat{I}_{i,j}$, presenting as a unified design.

Prompt Fidelity: Every $\hat{I}_{i,i}$ must adhere to the provided target effect prompt.

The pipeline then reformulates the font effect generation task into the combination of two sub-tasks including font effect generation for a reference character and font effect transfer from the reference character to each target character as follows.

$$\hat{I}_{ref} = g(\hat{M}_{ref} | T) \tag{2}$$

$$\hat{I}_i = h(\hat{M}_i | T, \hat{M}_{ref}, \hat{I}_{ref}), i = 1, \ldots, n \tag{3}$$

The function g(•) performs font effect generation based on a single irregular reference canvas, denoted as $\hat{M}_{ref}$. The function h(•) is used to generate consistent font effects, conditioned on the previously generated reference font effect image $\hat{I}_{ref}$, the mask $\hat{M}_{ref}$, and the current font mask. The pipeline chooses the same reference character mask for all font effect transfer characters. The details of how to implement these two functions including g(•) and h(•) are explained below.

Given that directly processing irregular canvases of varying resolutions presents several non-trivial challenges in training standard diffusion models, the technical solution rasterizes and positions the irregular canvas mask within a rectangular placeholder, as M=Rasterize ($\hat{M}$). Essentially, M is the binary rasterized form of $\hat{M}$ where the pixels inside $\hat{M}$ are with 1 and the other pixels are with 0. Additionally, a rectangular image I is utilized to encapsulate the irregular font effect image $\hat{I}$ and include an irregular alpha mask layer MI to eliminate the regions outside the irregular canvas. Given the irregular shaped canvas mask and image encapsulated within rectangle ones, the original Equation 3 is reformulated as follows.

$$I_k, M_{I_k} = g(M_k | T), k \in \{1, \ldots, n\} \tag{4}$$

In Equation 4, the predicted alpha mask layer $M_{I_k}$ is different from the input conditional font mask $M_k$, to ensure coherent and creative effects along the boundary regions. With the alpha mask prediction, the pipeline also avoids the necessity to use additional segmentation model to handle the artifacts outside the font-shaped canvas. The pipeline elucidates the key that differentiating the refined alpha mask from the conditional canvas mask is achieved through canvas mask augmentation during the training of the subsequent shape-adaptive generative model. The pipeline uses $\Phi \in R c in \times h \times w$ to represent the image latent features extracted by a VAE encoder before they are sent into the U-Net of the diffusion model. The pipeline uses $\Phi' \in Rn \times c$ to represent the reshaped and transformed latent features that are sent into the multi-head cross-attention mechanism. By applying different linear projections, the pipeline transforms $\Phi'$ into the query embedding space Q, and the text prompt embedding (or pixel embedding) into the key embedding space K and value embedding space V for cross-attention (or self-attention). To accommodate an irregularly shaped canvas, the pipeline introduces a specialized variant: shape-adaptive attention scheme. The key insight involves partitioning the entire image's feature maps into two groups: the foreground and the background. The pipeline uses $M_A$ to denote the foreground pixels, the subscript f g to label the key and value embeddings associated with the regions inside the irregular canvas, and the subscript bg to label the key and value embeddings associated with the regions outside the irregular canvas. The mathematical formulation is shown as follows. The shape-adaptive attention scheme can effectively minimize content creation outside the irregular canvas.

$$ShapeAdaptive-MultiHeadAttention(Q, K_{fg}, K_{bg}, V_{fg}, V_{bg}) = M_A \cdot \tag{5}$$

$$MultiHeadAttention(Q, K_{fg}, V_{fg}) + 1 - M_A) \cdot$$

$$MultiHeadAttention(Q, K_{bg}, K_{bg})$$

Figure 1E:
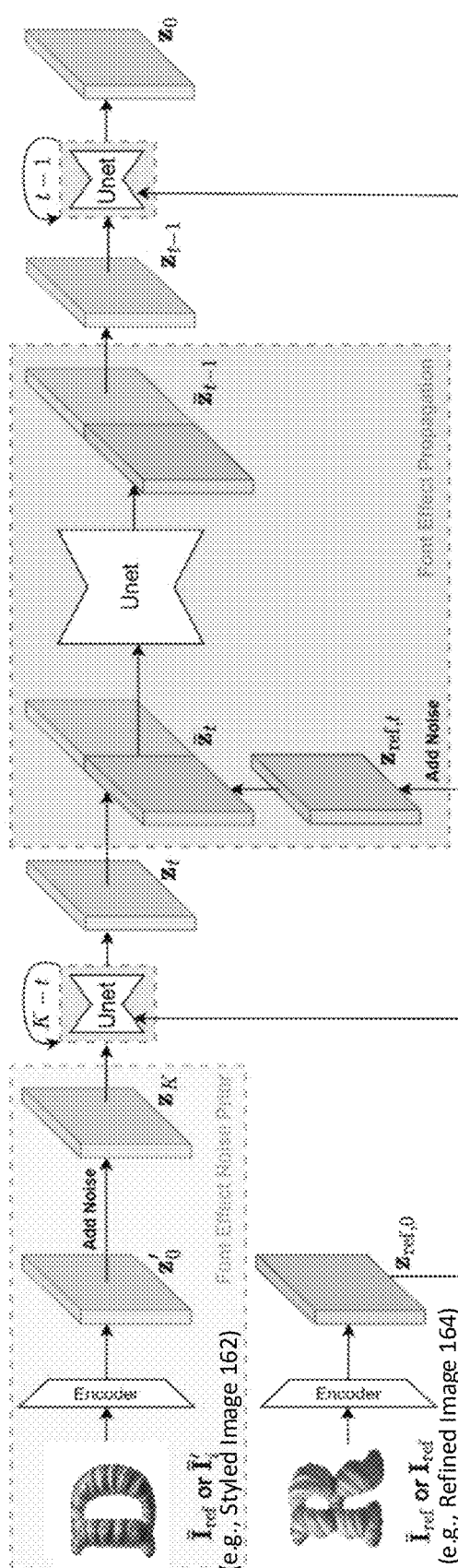

FIG. 1E illustrates font effect noise prior and font effect propagation within the shape-adaptive effect transfer scheme. The consistent font visual effect generation pipeline propagates the font effect information from the refined reference character image 164 to the styled target character image 162 by: at any denoising stage t within a U-Net, given the styled target character image's latent zt and the refined reference character image's latent zref,0, the pipeline escalates zref,0 to the same noise level as zt, yielding zref,t. The pipeline then concatenates zt with zref,t to obtain ⁻zt=Concat (zref,t, zt), which is then processed through U-Net for denoising. After deducing the noise component, the pipeline selectively utilizes the noise pertaining to zt for denoising zt to achieve zt−1, iterating this step until reaching z0. The effect propagation between the source latents and the target latents mainly happen within the self-attention modules.

In some implementations, the pipeline modifies the shape-adaptive generation model and the shape-adaptive refinement model to support processing the concatenated latent representations of a reference character image and a target character image with font effect prior. The option of setting the noise strengths with different values within SGM and SRM achieves better results.

It is observed that choosing a reference character (e.g., R) with a larger foreground area is beneficial, since the larger foreground providing more informative units for the self-attention mechanism, thereby enhancing the generation of new character images. In addition, the pipeline demonstrates flexibility across different language scripts, such as English, Chinese, Japanese, and Korean.

FIGS. 2A-2D are diagrams of an example user interface of an AI-based consistent font visual effect generation application that implements the techniques described herein. The example user interface shown in FIGS. 2A-2D is a user interface of an AI-based consistent font visual effect generation application within an AI-based design platform, such as but not limited to Microsoft Designer®. However, the techniques herein for AI-based consistent font visual effect generation are not limited to use in an AI-based design platform and may be used to generate characters for other types of applications including but not limited to presentation applications, website authoring applications, collaboration platforms, communications platforms, and/or other types of applications in which users create, view, and/or consistently transfer various styles of characters. Such applications can be a mini application in an AI-based design application, a stand-alone application, or a plug-in of any application on the client device 105, such as the browser application 112, the native application 114, and the like. For example, the system can work on the web or within a virtual meeting and collaboration application (e.g., Microsoft Teams®) or an email application (e.g., Outlook®). The system can be integrated into the Microsoft Viva® platform or could work within a browser (e.g., Windows® Edge®). The system can also work within a social media website/application (e.g., Facebook®, Instagram®).

Figure 2A:
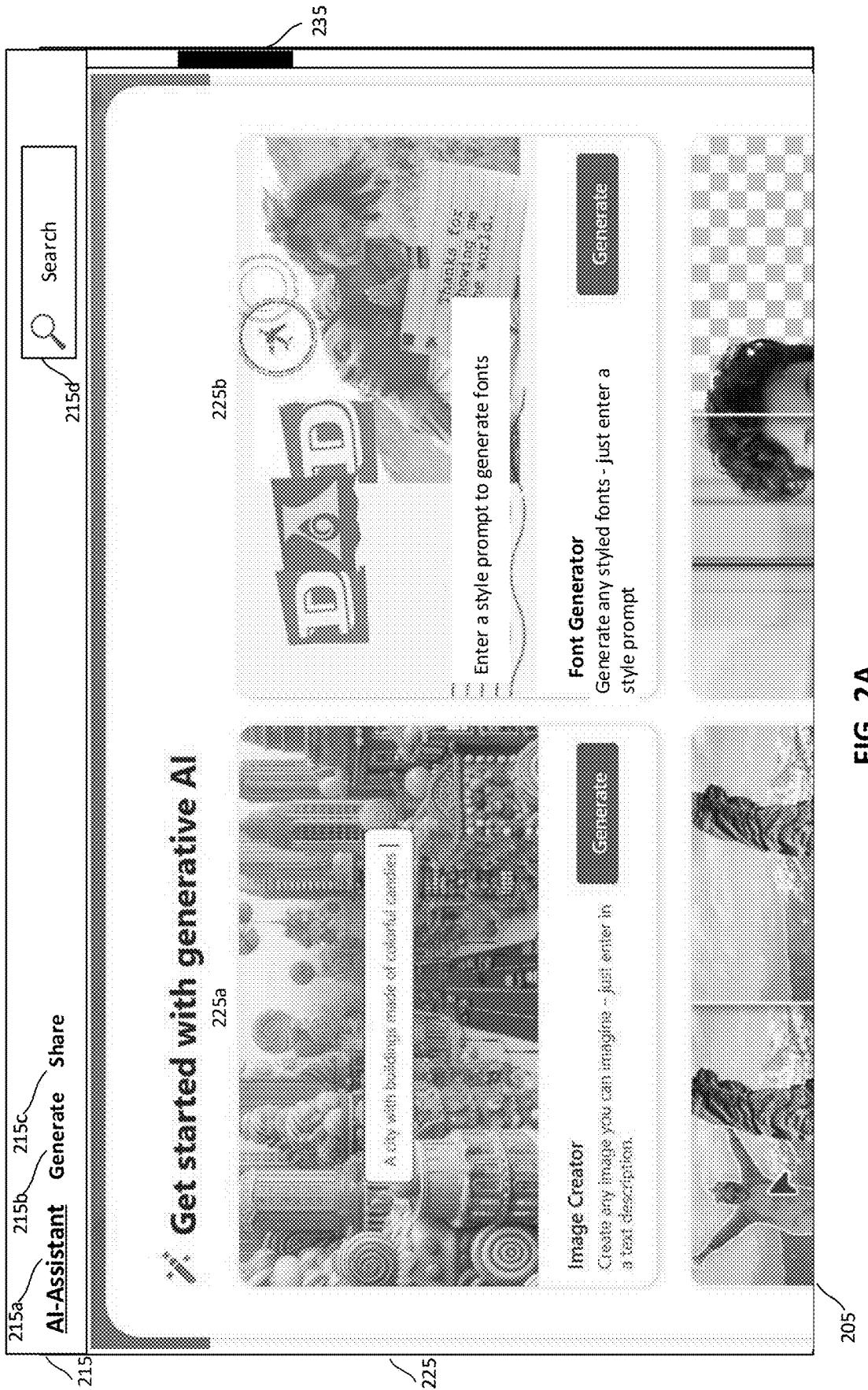
FIGS. 2A-2D are diagrams of example user interfaces of an AI-based consistent font visual effect generation application that implements the techniques described herein.

FIG. 2A shows an example of the user interface 205 of an AI-based consistent font visual effect generation application in which the user is interacting with AI generative model(s) to generate character(s) with the same desired style. The user interface 205 includes a control pane 215, a chat pane 225 and a scrollbar 235. The user interface 205 may be implemented by the native application 114 and/or the browser application 112.

In some implementations, the control pane 215 includes an Assistant button 215a, a Generate button 215b, a Share button 215c, and a search field 215d. The AI-Assistant button 215a can be selected to provide font visual style transfer assistant functions as later discussed. In some implementations, the chat pane 225 provides a workspace in which the user can enter prompts in the AI-based consistent font visual effect generation application for generating character(s) with a desired style. In the example shown in FIG. 2A, the chat pane 225 shows at least two mini application tiles 225a and 225b.

The mini application tile 225a represents an image creator and depicts a description of "Create any image you can image-just enter in a text description." The mini application tile 225a also depicts a prompt enter box over a background imagine and a "Generate" button. The prompt enter box shows a prompt of "a city with buildings made of colorful candies."

The mini application tile 225b represents a font generator and depicts a description of "Generate any styled fonts-just enter a style prompt." The mini application tile 225b also depicts a prompt enter box over a background image and a "Generate" button. The prompt enter box shows an instruction of "Enter a style prompt to generate fonts."

The application submits the textual prompt as discussed above and user information identifying the user of the application to the application services platform 110. The application services platform 110 processes the text prompt according to the techniques provided herein to generate character(s) with desired style(s).

The Generate button 215b can be selected to generate character(s) with desired style(s) a user style prompt. The Share button 215c can be selected to trigger a dropdown list of applications to share the generated character(s). For example, the user can insert the character(s) in a social media post (e.g., Facebook®) to celebrate the user's new job. The search field 215d is for a user to enter a search word, phrase, paragraph, and the like within the visual content library 142, the requests, prompts, and responses 144, the extracted/inferred user data 146 (e.g., user preferences), the training data 148, and the like. The fields in the consistent font visual effect generation application can provide auto-fill and/or spell-check functions.

Figure 2B:
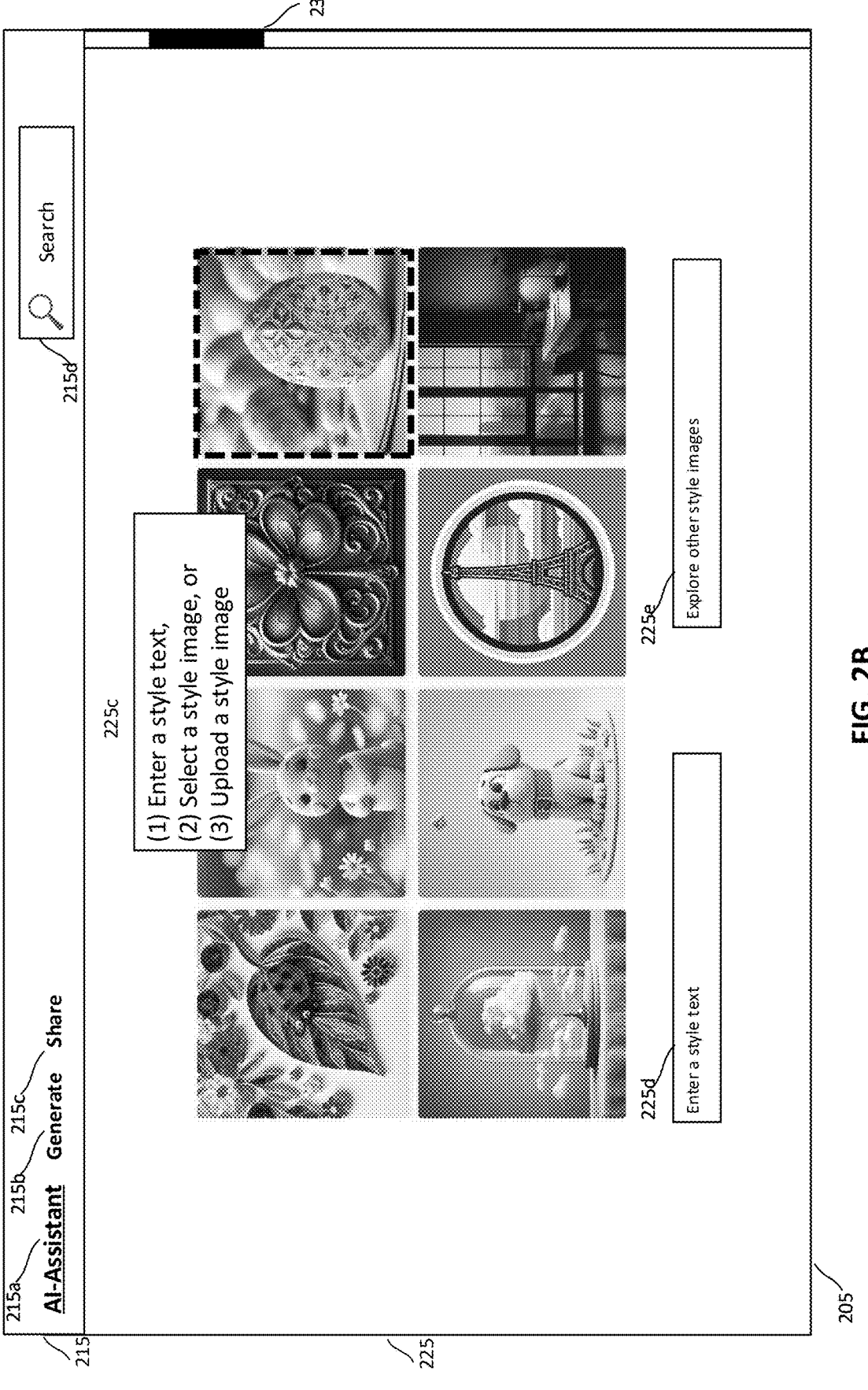

FIG. 2B continues from FIG. 2A upon a selection of the mini application tile 225b. In this example, the chat pane 225 shows a prompt enter box 225c with instructions of "(1) Enter a style text, (2) Select a style image, or (3) Upload a style image" and several style images for the user to select. After the user selects a style image of an easter egg, the consistent font visual effect generation application can generate characters with the easter egg style for the user as the embodiments discussed above. The chat pane 225 shows a field 225d with an instruction of "Enter a style text" and a field 225e with an instruction of "Explore other styles."

Figure 2C:
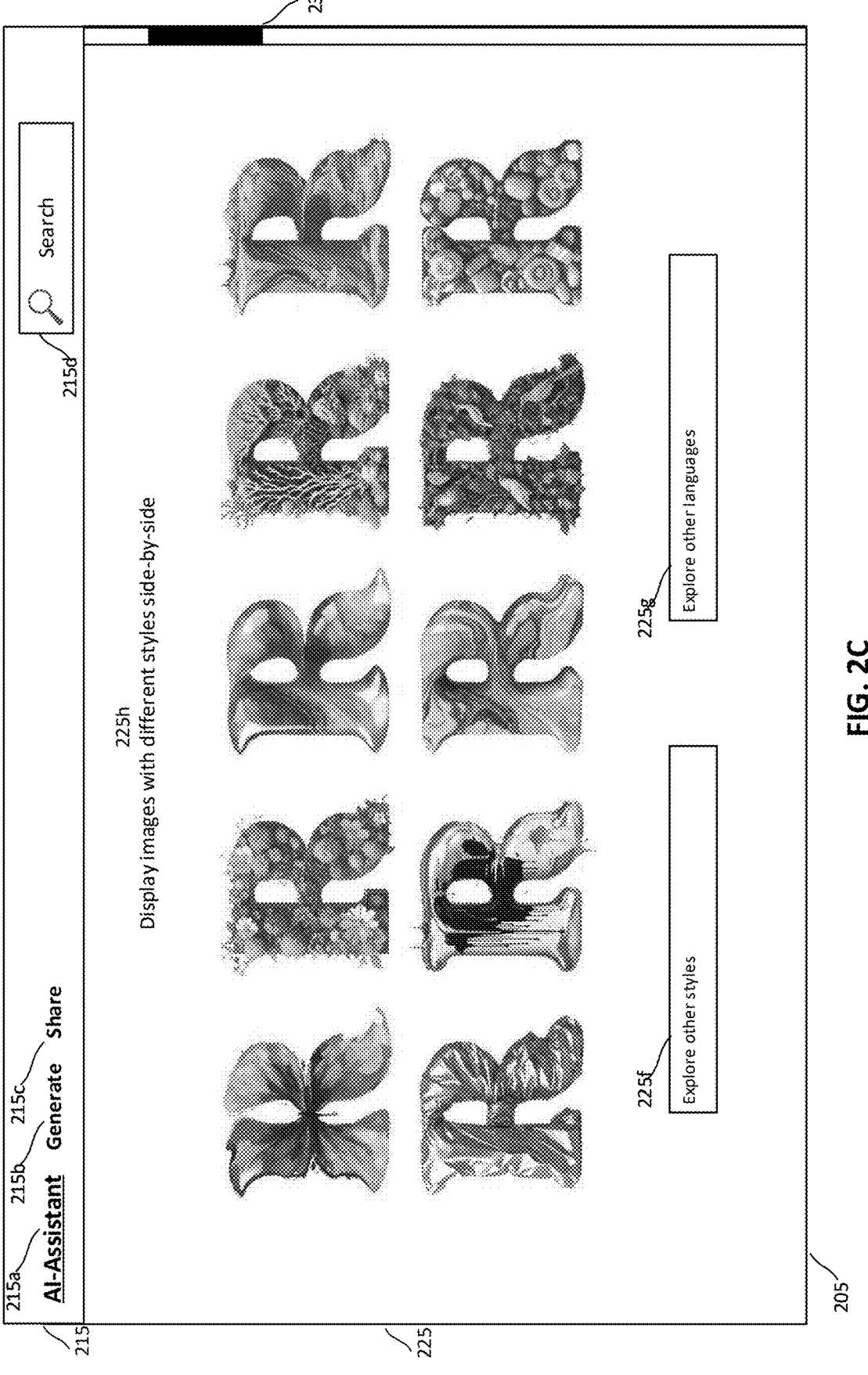

In FIG. 2C, the chat pane 225 shows a field 225f with an instruction of "Explore other styles" and a field 225g with an instruction of "Explore other styles." Upon a user entry of a character R in the field 225f in FIG. 2C, the chat pane 225 shows an instruction 225h of "Display images with different styles side-by-side" and the respective character R images with various styles, such as a butterfly, garden flowers, or the like, and the natural/refined object edges. For example, a character R in the garden flowers style has flowers naturally protruding outside of the smooth R-shaped boundary.

Figure 2D:
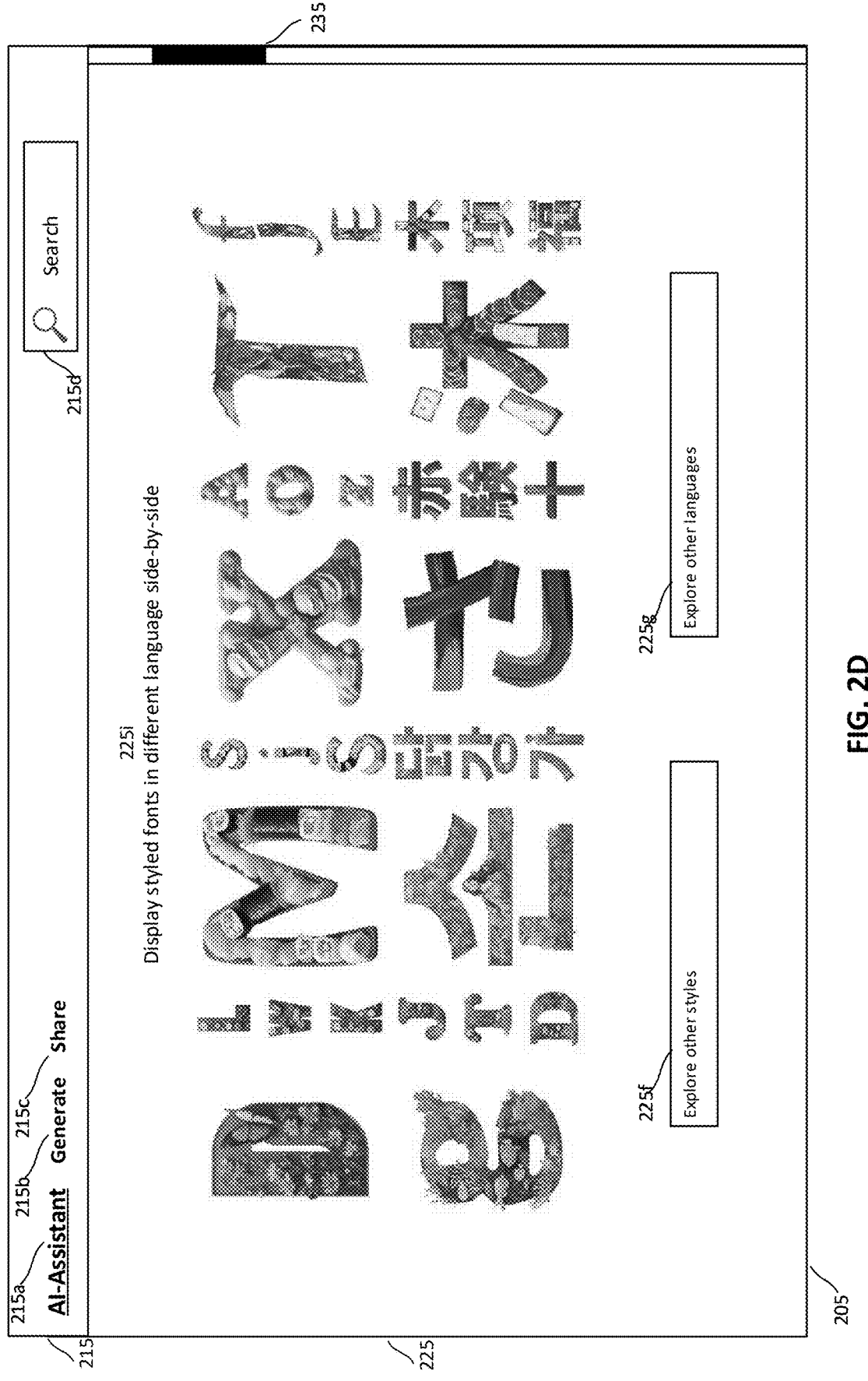

Upon a user entry of English, Chinese, Japanese, and Korean in the field 225g in FIG. 2D, the chat pane 225 shows an instruction 225i of "Display styled fonts in different language side-by-side" and the respective language character images with various styles, such as a coral reef, sushi, ice creams, ham and cheese, or the like. For example, a character "g" in the coral reef style has corals and fishes naturally protruding outside of the smooth g-shaped boundary.

In one embodiment, the user can hit the "Generate" button to have the application randomly generate characters in other styles. In some implementations, the pipeline provides a feedback loop by augmenting thumbs up and thumbs down buttons for each character image output in the user interface 205. If the user dislikes a character image output, the application can ask why and use the user feedback data to improve the generative model(s) 126. A thumbs down click could also prompt the user to indicate whether the character image output was too bright, too dark, too big, too small, or was assigned the wrong style/object, or the like. In other implementations, the application can retrieve user image preferences data from the user database 128, and adjusts the rejected character image output based on the user image preferences data. The user database 128 can be implemented on the application services platform 110 in some implementations. In other implementations, at least a portion of the user database 128 are implemented on an external server that is accessible by the prompt construction unit 124.

In one embodiment, the character image outputs are saved in the visual content library 142 in case the same user wants to use the same character image outputs. The extracted/inferred user data 146 (e.g., user preferences) is tentatively linked with a user ID during a user session and saved in a cache. After the user session, extracted/inferred user data 146 is de-linked form the user ID as metadata of the resulted new style image(s) and saved in the visual content library 142. In addition, the extracted/inferred user data 146 linked with the user ID is saved back to the user database 128.

The generative model(s) 126 may be included as part of the application services platform 110 or they may be external models that are called by the application services platform 110. In implementations where other models in addition to the generative model(s) 126 are utilized, those models may be included as part of the application services platform 110 or they may be external models that are called by the application services platform 110.

The request processing unit 122 also coordinates communication and exchange of data among components of the application services platform 110 as discussed in the examples which follow. The request processing unit 122 receives a user request to generate a character with desired style(s) from the native application 114 or the browser application 112.

In some implementations, the application services platform 110 complies with privacy guidelines and regulations that apply to the usage of the user data included in the user database 128 to ensure that users have control over how the application services platform 110 utilizes their data. The user is provided with an opportunity to opt into the application services platform 110 to allow the application services platform 110 to access the user data and enable the generative model(s) 126 to generate characters according to the user's desired style/objects.

The enterprise data storage 140 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCl), network virtualization and software-defined networking (SDN), container storage, and the like.

A benchmark is introduced to facilitate a comprehensive evaluation of the pipeline, which comprises 145 test cases using prompts of various lengths and categorized into five themes: Nature, Material, Food, Animal, and Landscape. The results are shown in the table in FIG. 3. M-CLIP-Int and M-CLIP-Ext metrics make use of an additional mask to direct the evaluation towards the intended areas, both inside and outside the canvas. In the calculations for M-CLIP-Int and M-CLIP-Ext, areas outside the canvas are masked in white, and subsequently the altered CLIP similarity scores are averaged across the benchmark.

SDXL faces challenges in performing the font effect generation task due to missing shape-specific guidance. Conversely, SDXL-Inpaint, while not tailored to fill the entire area with designated content, often produces barely recognizable shapes. Both SDXL-ControlNet-Canny and SDXL-ControlNet-Depth are capable of processing masked inputs; however, their training primarily focuses on matching prompts with the entire rectangle image canvas, inadvertently causing prompt content to appear outside the intended shape area. This misalignment adversely affects their M-CLIP-Ext scores, as detailed in FIG. 3. Additionally, the lack of targeted control guidance within the shape leads to diminished M-CLIP-Int scores for these models. As detailed in FIG. 3, the shape-adaptive attention approach of the pipeline not only markedly reduces the generation of background elements, but also enhances the creation and intricacy of foreground content.

Figure 6:
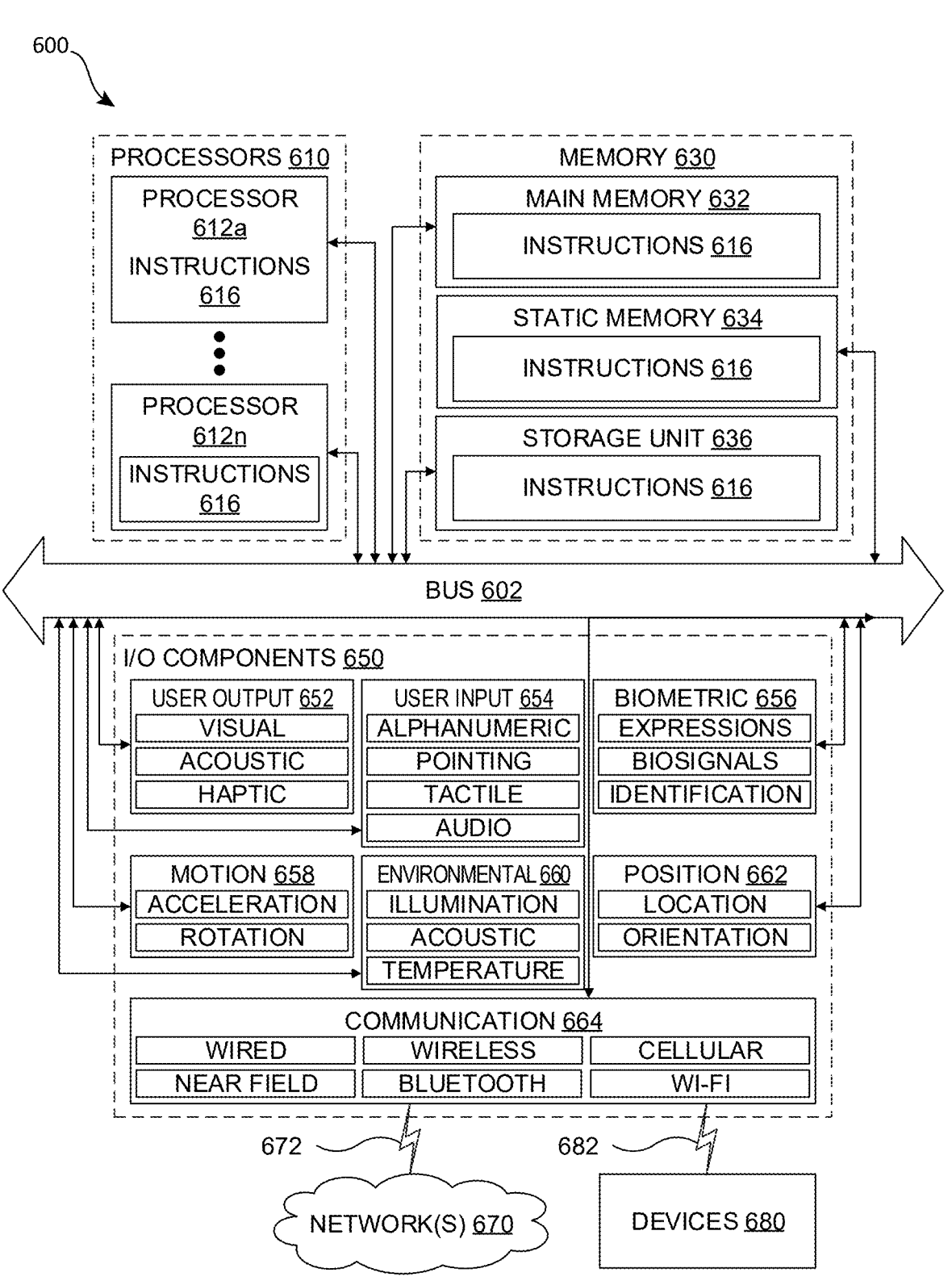
FIG. 6 is a block diagram showing components of an example machine configured to read instructions from a machine-readable medium and perform any of the features described herein.

FIG. 4 is a flow chart of an example process 400 for AI-based consistent character visual effects transfer according to the techniques disclosed herein. The process 400 can be implemented by the application services platform 110 or its components shown in the preceding examples. The process 400 may be implemented in, for instance, the example machine including a processor and a memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is contemplated that various embodiments of the process 400 may be performed in any order or combination and need not include all the illustrated steps.

In stage one of the shape-adaptive generation model, for example, in step 402, a request processing unit (e.g., the request processing unit 122) receives, at a client device (e.g., the client device 105), a style prompt. For instance, the style prompt is a text prompt (e.g., the text prompt 150 in FIG. 1B: croissant) or an image prompt (e.g., the Easter egg image prompt in FIG. 2B).

In step 404, a prompt construction unit (e.g., the prompt construction unit 124) constructs a first prompt by appending a font mask (e.g., the character R font mask 153) of a reference character (e.g., R) and the style prompt to a first instruction string, the first instruction string including instructions to a first text-to-image model (e.g., the text-to-image model 126a, such as a conditional diffusion model) to iteratively generate salient content based on the style prompt and concentrate the salient content within the font mask of the reference character (e.g., the character R font mask 153) as a first image of the reference character (e.g., the first image 152 with 3-croissant set in r-shape with background). In step 406, the prompt construction unit provides as an input the first prompt to the first text-to-image model and receiving as an output the first image from the first text-to-image model.

In step 408, the image processing unit 127 duplicates the first image and concatenates the first images as a second image (e.g., the second image 156 showing a pair of generally R-shaped croissant graphics). In step 410, the image processing unit 127 generates a combined font mask (e.g., the combined font mask 158 of R and D) of the font mask of the reference character and a font mask (e.g., the character D font mask 160) of a target character (e.g., D).

In stage two of the shape-adaptive generation model, in step 412, the prompt construction unit (e.g., the prompt construction unit 124) constructs a second prompt by appending the combined font mask (e.g., the combined font mask 158 of R and D) and the second image (e.g., the second image 156 showing a pair of generally R-shaped croissant graphics) to a second instruction string, the second instruction string including instructions to the first text-to-image model (e.g., the text-to-image model 126a, such as a conditional diffusion model) to iteratively generate salient content based on the second image and in-paint the salient content within a half of the combined font mask as a third image of the reference character and the target character (e.g., the third image 159 showing a generally R-shaped croissant graphic and a generally D-shaped croissant graphic). In step 414, the prompt construction unit provides as an input the second prompt to the first text-to-image model and receiving as an output the third image from the first text-to-image model.

In step 416, the image processing unit 127 crops a styled target character image (e.g., the styled character D image 162) from the third image (e.g., the third image 159 showing a generally R-shaped croissant graphic and a generally D-shaped croissant graphic) using a font mask of a target character (e.g., the character D font mask 160).

In step 418, the request processing unit (e.g., the request processing unit 122) provides the styled target character image (e.g., the styled character D image 162) to the client device 105. In step 420, the request processing unit causes a user interface (e.g., the user interface 205) of the client device to display the styled target character image (e.g., the styled character D image 162).

During a training dataset preparation process, the prompt construction unit 124 constructs a sixth prompt by appending image captions to a sixth instruction string, the sixth instruction string including instructions to a second text-to-image model (e.g., DALL-E 3 or a diffusion model) to create a plurality of text prompts based on the image captions, to iteratively (1) generate based on a respective one of the text prompts a respective image (e.g., the DALL-E 3 image 171 of a city high-rise landscape) differentiating a foreground from a background, and (2) segregate the foreground from the respective image as a respective irregular-shaped canvas mask (e.g., the mask 172 of the city high-rise landscape) and a respective irregular-shaped image (e.g., the city high-rise landscape in the image 171 yet with a white background), and to generate a dataset of triplet instances, each instance consisting of the respective irregular-shaped canvas mask (e.g., the mask 172 of the city high-rise landscape), the respective irregular-shaped image (e.g., the city high-rise landscape in the image 171 yet with a white background), and the respective text prompt (e.g., a text prompt of "a city high-rise landscape"). The prompt construction unit provides as an input the sixth prompt to the second text-to-image model and receiving as an output the dataset of triplet instances from the second text-to-image model. In one embodiment, the first text-to-image model is a conditional diffusion model, and the pipeline trains the conditional diffusion model based on the dataset of triplet instances.

In stage one of the shape-adaptive refinement model, the image processing unit 127 crops a styled reference character image (e.g., the styled reference character image 155 with only the three croissants and a white background) from the first image using the font mask of the reference character (e.g., the character R font mask 153). The prompt construction unit 124 constructs a third prompt by appending the styled reference character image (e.g., the styled reference character image 155 with only the three croissants and a white background) and the style prompt to a third instruction string, the third instruction string including instructions to the text-to-image model to iteratively regenerate edge details of the styled reference character image as a refined image of the reference character (e.g., the refined character R image 164 has the three croissants in a generally R-shaped boundary with more defined and natural croissant edges in a white background). The prompt construction unit 124 provides as an input the third prompt to the text-to-image model and receives as an output the refined image of the reference character from the text-to-image model.

In stage two of the shape-adaptive refinement model, the image processing unit 127 concatenates the refined image of the reference character (e.g., the refined R image 164 with the natural croissant edges) and the styled target character image (e.g., the styled character D image 162) as a fourth image (e.g., the fourth image 166). The prompt construction unit 124 constructs a fourth prompt by appending the fourth image to a fourth instruction string, the fourth instruction string including instructions to the text-to-image model to iteratively in-paint edge details of the styled target character image (e.g., the styled character D image 162) to a half of the fourth image including the styled target character image the as a refined image of the reference character and the target character (e.g., the refined image 168 of character R and character D). The prompt construction unit 124 provides as an input the fourth prompt to the text-to-image model and receiving as an output the refined image of the target character and the refined font mask of the target character from the text-to-image model.

The image processing unit 127 crops a refined image of the target character (e.g., the reined character D image 169 with natural edge details) from the refined image of the reference character and target character (e.g., the refined image 168 of character R and character D). The prompt construction unit 124 constructs a fifth prompt by appending the refined image of the target character (e.g., the refined image 168 of character R and character D) to a fifth instruction string, the fifth instruction string including instructions to a vision generative model (e.g., the conditional VAE) to extract an alpha channel of the refined image of the target character (e.g., the reined character D image 169) as a refined mask of the target character (e.g., the reined character D mask 170). The prompt construction unit 124 provides as an input the fifth prompt to the vision generative model and receiving as an output the refined mask of the target character from the vision generative model.

The request processing unit 122 provides the refined image of the target character (e.g., the refined character D image 169 with natural edge details) and the refined font mask of the target character (e.g., the refined character D mask 170 with natural edge details) to the client device (e.g., the client device 105). The request processing unit causes the user interface (e.g., the user interface 205) of the client device to display the refined image of the target character and the refined font mask of the target character.

In one embodiment, the vision generative model is a conditional variational autoencoder (VAE), and the pipeline augments a decoder of the conditional VAE with an additional input channel and an additional output channel (e.g., VAE inputs and VAE Outputs in FIG. 1D) that facilitate mask conditioning and prediction. To train the conditional VAE, the pipeline prompts a segmentation model (e.g., a prompt-based instance segmentation model (e.g., SAM) or a U-net) to generate original segmentation masks, applies alpha mask augmentation on the original segmentation masks to generate augmented masks, and then trains the conditional VAE using the augmented masks as input conditions.

The system allows users to enter style prompts thus simplifying the consistent artistic font creative process for the users. This ease of use increases user productivity and utilization, as well as attracts more non-technical users. By automating the consistent style transfer on character process, the system eliminates reliance on user-manually-generated detailed style prompts. This solution significantly lowers the barrier to create high-quality, stylized characters, and makes the consistent artistic character creation process more efficient and open. The system can apply the consistent artistic style transfer to characters of a range of visual content types, including images, images with text, videos, animations, or the like, thereby enhancing the versatility of a character creation platform/application.

In some implementations, the system can apply/share the character image outputs immediately, so that the user can celebrate the relevant event (e.g., the user's birthday). Moreover, consistent artistic characters can be a fun and creative way for individuals to add a personal touch to their profile picture, invitations, cards, and other graphic designs. By creating consistent artistic characters that reflects their preferences, individuals can create a unique and memorable design that stands out from traditional graphic designs for wedding invitations, birthday cards, or holiday greetings.

Therefore, the system provides consistent artistic visual content style transfer on characters to match with user style prompt(s), without manually crafting detailed language prompts. The system personalizes the consistent artistic character image outputs for the user. In addition, the system can modify the consistent artistic character image outputs based on user feedback(s).

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
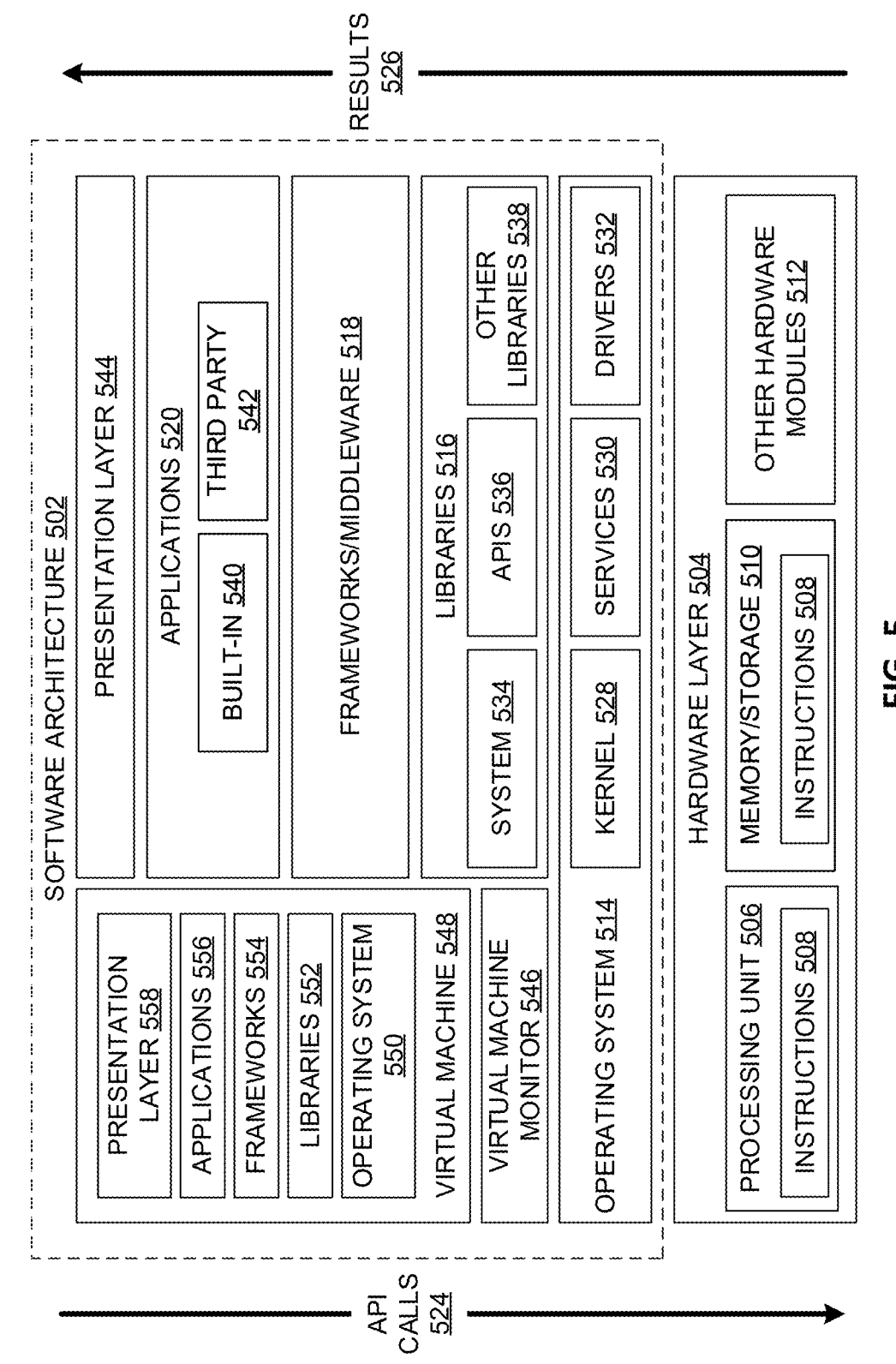
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor, and
   a machine-readable storage medium storing executable instructions which, when executed by the processor, cause the processor alone or in combination with other processors to perform the following operations:

receiving, at a client device, a style prompt including at least one visual object to be visible in a character in a desired style;

constructing, via a prompt construction unit, a first prompt by appending a font mask of a reference character and the style prompt to a first instruction string, the first instruction string including instructions to a first text-to-image model to iteratively generate salient content based on the style prompt and concentrate the salient content within the font mask of the reference character as a first image of the reference character;

providing as an input the first prompt to the first text-to-image model and receiving as an output the first image from the first text-to-image model;

duplicating the first image and concatenating the first images as a second image;

generating a combined font mask of the font mask of the reference character and a font mask of a target character, wherein the target character is different from the reference character;

constructing, via the prompt construction unit, a second prompt by appending the combined font mask and the second image to a second instruction string, the second instruction string including instructions to the first text-to-image model to iteratively generate salient content based on the second image and in-paint the salient content within a half of the combined font mask as a third image of the reference character and the target character;

providing as an input the second prompt to the first text-to-image model and receiving as an output the third image from the first text-to-image model;

cropping a styled target character image from the third image using the font mask of the target character;

providing the styled target character image to the client device; and causing a user interface of the client device to display the styled target character image.

2. The data processing system of claim 1, wherein the machine-readable storage medium further includes instructions configured to cause the processor alone or in combination with other processors to perform operations of:

cropping a styled reference character image from the first image using the font mask of the reference character;

constructing, via the prompt construction unit, a third prompt by appending the styled reference character image and the style prompt to a third instruction string, the third instruction string including instructions to the text-to-image model to iteratively regenerate edge details of the styled reference character image as a refined image of the reference character; and providing as an input the third prompt to the text-to-image model and receiving as an output the refined image of the reference character from the text-to-image model.

3. The data processing system of claim 2, wherein the machine-readable storage medium further includes instructions configured to cause the processor alone or in combination with other processors to perform operations of:

concatenating the refined image of the reference character and the styled target character image as a fourth image;

constructing, via the prompt construction unit, a fourth prompt by appending the fourth image to a fourth instruction string, the fourth instruction string including instructions to the text-to-image model to iteratively in-paint edge details of the styled target character image to a half of the fourth image including the styled target character image as a refined image of the reference character and the target character;

providing as an input the fourth prompt to the text-to-image model and receiving as an output the refined image of the target character and the refined font mask of the target character from the text-to-image model;

cropping a refined image of the target character from the refined image of the reference character and target character;

constructing, via the prompt construction unit, a fifth prompt by appending the refined image of the target character to a fifth instruction string, the fifth instruction string including instructions to a vision generative model to extract an alpha channel of the refined image of the target character as a refined mask of the target character;

providing as an input the fifth prompt to the vision generative model and receiving as an output the refined mask of the target character from the vision generative model;

providing the refined image of the target character and the refined font mask of the target character to the client device; and causing the user interface of the client device to display the refined image of the target character and the refined font mask of the target character, wherein the first image includes the at least one visual object visible in the reference character in the desired style, and wherein the third image includes the first image and an image of the target character with the at least one visual object visible in the desired style.

4. The data processing system of claim 2, wherein the machine-readable storage medium further includes instructions configured to cause the processor alone or in combination with other processors to perform operations of:

constructing, via the prompt construction unit, a sixth prompt by appending image captions to a sixth instruction string, the sixth instruction string including instructions to a second text-to-image model to create a plurality of text prompts based on the image captions, to iteratively (1) generate based on a respective one of the text prompts a respective image differentiating a foreground from a background, and (2) segregate the foreground from the respective image as a respective irregular-shaped canvas mask and a respective irregular-shaped image, and to generate a dataset of triplet instances, each instance consisting of the respective irregular-shaped canvas mask, the respective irregular-shaped image, and the respective text prompt; and providing as an input the sixth prompt to the second text-to-image model and receiving as an output the dataset of triplet instances from the second text-to-image model.

5. The data processing system of claim 4, wherein the second text-to-image model is DALL-E 3 or a diffusion model.

6. The data processing system of claim 4, wherein the first text-to-image model is a conditional diffusion model, and the machine-readable storage medium further includes instructions configured to cause the processor alone or in combination with other processors to perform operations of:

training the conditional diffusion model based on the dataset of triplet instances.

7. The data processing system of claim 3, wherein the vision generative model is a conditional variational autoencoder (VAE), and the machine-readable storage medium further includes instructions configured to cause the processor alone or in combination with other processors to perform operations of:

augmenting a decoder of the conditional VAE with an additional input channel and an additional output channel that facilitate mask conditioning and prediction.

8. The data processing system of claim 7, wherein the machine-readable storage medium further includes instructions configured to cause the processor alone or in combination with other processors to perform operations of:

prompting a segmentation model to generate original segmentation masks;

applying alpha mask augmentation on the original segmentation masks to generate augmented masks; and training the conditional VAE using the augmented masks as input conditions.

9. The data processing system of claim 8, wherein the segmentation model is a prompt-based instance segmentation model or a U-net.

10. The data processing system of claim 1, wherein the style prompt is a text prompt or an image prompt.

11. A method comprising:

receiving, at a client device, a style prompt including at least one visual object to be visible in a character in a desired style;

constructing, via a prompt construction unit, a first prompt by appending a font mask of a reference character and the style prompt to a first instruction string, the first instruction string including instructions to a first text-to-image model to iteratively generate salient content based on the style prompt and concentrate the salient content within the font mask of the reference character as a first image of the reference character;

providing as an input the first prompt to the first text-to-image model and receiving as an output the first image from the first text-to-image model;

duplicating the first image and concatenating the first images as a second image;

generating a combined font mask of the font mask of the reference character and a font mask of a target character, wherein the target character is different from the reference character;

constructing, via the prompt construction unit, a second prompt by appending the combined font mask and the second image to a second instruction string, the second instruction string including instructions to the first text-to-image model to iteratively generate salient content based on the second image and in-paint the salient content within a half of the combined font mask as a third image of the reference character and the target character;

providing as an input the second prompt to the first text-to-image model and receiving as an output the third image from the first text-to-image model;

cropping a styled target character image from the third image using the font mask of the target character;

providing the styled target character image to the client device; and causing a user interface of the client device to display the styled target character image.

12. The method of claim 11, further comprising:

cropping a styled reference character image from the first image using the font mask of the reference character;

constructing, via the prompt construction unit, a third prompt by appending the styled reference character image and the style prompt to a third instruction string, the third instruction string including instructions to the text-to-image model to iteratively regenerate edge details of the styled reference character image as a refined image of the reference character; and providing as an input the third prompt to the text-to-image model and receiving as an output the refined image of the reference character from the text-to-image model.

13. The method of claim 12, further comprising:

concatenating the refined image of the reference character and the styled target character image as a fourth image;

constructing, via the prompt construction unit, a fourth prompt by appending the fourth image to a fourth instruction string, the fourth instruction string including instructions to the text-to-image model to iteratively in-paint edge details of the styled target character image to a half of the fourth image including the styled target character image the as a refined image of the reference character and the target character;

providing as an input the fourth prompt to the text-to-image model and receiving as an output the refined image of the target character and the refined font mask of the target character from the text-to-image model;

cropping a refined image of the target character from the refined image of the reference character and target character;

constructing, via the prompt construction unit, a fifth prompt by appending the refined image of the target character to a fifth instruction string, the fifth instruction string including instructions to a vision generative model to extract an alpha channel of the refined image of the target character as a refined mask of the target character;

providing as an input the fifth prompt to the vision generative model and receiving as an output the refined mask of the target character from the vision generative model;

providing the refined image of the target character and the refined font mask of the target character to the client device; and causing the user interface of the client device to display the refined image of the target character and the refined font mask of the target character.

14. The method of claim 12, further comprising:

constructing, via the prompt construction unit, a sixth prompt by appending image captions to a sixth instruction string, the sixth instruction string including instructions to a second text-to-image model to create a plurality of text prompts based on the image captions, to iteratively (1) generate based on a respective one of the text prompts a respective image differentiating a foreground from a background, and (2) segregate the foreground from the respective image as a respective irregular-shaped canvas mask and a respective irregular-shaped image, and to generate a dataset of triplet instances, each instance consisting of the respective irregular-shaped canvas mask, the respective irregular-shaped image, and the respective text prompt; and providing as an input the sixth prompt to the second text-to-image model and receiving as an output the dataset of triplet instances from the second text-to-image model.

15. The method of claim 14, wherein the first text-to-image model is a conditional diffusion model, and the method further comprises:

training the conditional diffusion model based on the dataset of triplet instances.

16. A non-transitory computer readable medium on which are stored instructions that, when executed, cause a programmable device to perform functions of:

receiving, at a client device, a style prompt including at least one visual object to be visible in a character in a desired style;

constructing, via a prompt construction unit, a first prompt by appending a font mask of a reference character and the style prompt to a first instruction string, the first instruction string including instructions to a first text-to-image model to iteratively generate salient content based on the style prompt and concentrate the salient content within the font mask of the reference character as a first image of the reference character;

providing as an input the first prompt to the first text-to-image model and receiving as an output the first image from the first text-to-image model;

duplicating the first image and concatenating the first images as a second image;

generating a combined font mask of the font mask of the reference character and a font mask of a target character, wherein the target character is different from the reference character;

constructing, via the prompt construction unit, a second prompt by appending the combined font mask and the second image to a second instruction string, the second instruction string including instructions to the first text-to-image model to iteratively generate salient content based on the second image and in-paint the salient content within a half of the combined font mask as a third image of the reference character and the target character;

providing as an input the second prompt to the first text-to-image model and receiving as an output the third image from the first text-to-image model;

cropping a styled target character image from the third image using the font mask of the target character;

providing the styled target character image to the client device; and causing a user interface of the client device to display the styled target character image.

17. The non-transitory computer readable medium of claim 16, wherein the instructions when executed, further cause the programmable device to perform functions of:

cropping a styled reference character image from the first image using the font mask of the reference character;

constructing, via the prompt construction unit, a third prompt by appending the styled reference character image and the style prompt to a third instruction string, the third instruction string including instructions to the text-to-image model to iteratively regenerate edge details of the styled reference character image as a refined image of the reference character; and providing as an input the third prompt to the text-to-image model and receiving as an output the refined image of the reference character from the text-to-image model.

18. The non-transitory computer readable medium of claim 17, wherein the instructions when executed, further cause the programmable device to perform functions of:

concatenating the refined image of the reference character and the styled target character image as a fourth image;

constructing, via the prompt construction unit, a fourth prompt by appending the fourth image to a fourth instruction string, the fourth instruction string including instructions to the text-to-image model to iteratively in-paint edge details of the styled target character image to a half of the fourth image including the styled target character image the as a refined image of the reference character and the target character;

providing as an input the fourth prompt to the text-to-image model and receiving as an output the refined image of the target character and the refined font mask of the target character from the text-to-image model;

cropping a refined image of the target character from the refined image of the reference character and target character;

constructing, via the prompt construction unit, a fifth prompt by appending the refined image of the target character to a fifth instruction string, the fifth instruction string including instructions to a vision generative model to extract an alpha channel of the refined image of the target character as a refined mask of the target character;

providing as an input the fifth prompt to the vision generative model and receiving as an output the refined mask of the target character from the vision generative model;

providing the refined image of the target character and the refined font mask of the target character to the client device; and causing the user interface of the client device to display the refined image of the target character and the refined font mask of the target character.

19. The non-transitory computer readable medium of claim 17, wherein the instructions when executed, further cause the programmable device to perform functions of:

constructing, via the prompt construction unit, a sixth prompt by appending image captions to a sixth instruction string, the sixth instruction string including instructions to a second text-to-image model to create a plurality of text prompts based on the image captions, to iteratively (1) generate based on a respective one of the text prompts a respective image differentiating a foreground from a background, and (2) segregate the foreground from the respective image as a respective irregular-shaped canvas mask and a respective irregular-shaped image, and to generate a dataset of triplet instances, each instance consisting of the respective irregular-shaped canvas mask, the respective irregular-shaped image, and the respective text prompt; and providing as an input the sixth prompt to the second text-to-image model and receiving as an output the dataset of triplet instances from the second text-to-image model.

20. The non-transitory computer readable medium of claim 19, wherein the first text-to-image model is a conditional diffusion model, and wherein the instructions when executed, further cause the programmable device to perform functions of:

training the conditional diffusion model based on the dataset of triplet instances.

* * * * *